(12) United States Patent
Yoshizawa et al.

(10) Patent No.: US 12,243,403 B2
(45) Date of Patent: Mar. 4, 2025

(54) SAFETY MONITORING DEVICE, SAFETY MONITORING METHOD, AND PROGRAM

(71) Applicant: Konica Minolta, Inc., Tokyo (JP)

(72) Inventors: Masanori Yoshizawa, Hino (JP); Hideki Morita, Hino (JP)

(73) Assignee: Konica Minolta, Inc., Tokyo (JP)

(*) Notice: Subject to any disclaimer, the term of this patent is extended or adjusted under 35 U.S.C. 154(b) by 57 days.

(21) Appl. No.: 18/021,398

(22) PCT Filed: May 24, 2021

(86) PCT No.: PCT/JP2021/019575
§ 371 (c)(1),
(2) Date: Feb. 15, 2023

(87) PCT Pub. No.: WO2022/054345
PCT Pub. Date: Mar. 17, 2022

(65) Prior Publication Data
US 2023/0306833 A1   Sep. 28, 2023

(30) Foreign Application Priority Data
Sep. 14, 2020 (JP) .................. 2020-153514

(51) Int. Cl.
*G08B 21/02* (2006.01)
*G01S 17/86* (2020.01)
(Continued)

(52) U.S. Cl.
CPC .............. *G08B 21/02* (2013.01); *G01S 17/86* (2020.01); *G01S 17/89* (2013.01); *G06V 10/764* (2022.01); *G06V 20/52* (2022.01)

(58) Field of Classification Search
None
See application file for complete search history.

(56) References Cited

U.S. PATENT DOCUMENTS 9,496,102 B2 * 11/2016 Bates .................. H01H 13/86
9,584,891 B1 *  2/2017 Blaszczak ............ H04R 1/028
(Continued)

FOREIGN PATENT DOCUMENTS

CA        2460270 C  *  3/2012 ............ G08B 21/10
CN     106610368 A  *  5/2017
(Continued)

OTHER PUBLICATIONS

International Search Report (ISR) dated Aug. 3, 2021 filed in PCT/JP2021/019575.
(Continued)

*Primary Examiner* — Fekadeselassie Girma
(74) *Attorney, Agent, or Firm* — RANKIN, HILL & CLARK LLP

(57) ABSTRACT

A safety monitoring device (10) includes the area setting unit (12) capable of setting a plurality of alarm activation target areas with respect to a sensing target area of a safety sensor, an alarm activation type setting unit (13) capable of setting the type of an arbitrary alarm activation function with respect to each of the alarm activation target areas, and a moving body recognition analysis unit (16) that recognizes the motion of a moving body on the basis of sensor data measured by the safety sensor. The safety monitoring device includes a sensor data acquisition unit (lidar data acquisition unit (15)) that acquires three-dimensional data as sensor data from the safety sensor. The moving body recognition analysis unit extracts a moving body from the sensing target area on the basis of the three-dimensional data and senses traveling of the moving body to each of the alarm activation target areas.

35 Claims, 28 Drawing Sheets

(51) Int. Cl.
    *G01S 17/89*       (2020.01)
    *G06V 10/764*      (2022.01)
    *G06V 20/52*       (2022.01)

(56) References Cited

U.S. PATENT DOCUMENTS

| | | | | |
|---|---|---|---|---|
| 9,628,130 | B2* | 4/2017 | Ye | H04M 1/7246 |
| 9,847,805 | B2* | 12/2017 | Sirichai | H04B 1/3888 |
| 11,820,025 | B2* | 11/2023 | Vu | G01S 17/87 |
| 2015/0010289 | A1 | 1/2015 | Lindblom | |
| 2015/0049911 | A1 | 2/2015 | Doettling et al. | |
| 2016/0105644 | A1 | 4/2016 | Smith et al. | |
| 2018/0211114 | A1 | 7/2018 | Laska et al. | |
| 2023/0157757 | A1* | 5/2023 | Braido | G06T 19/003 |
| | | | | 345/419 |

FOREIGN PATENT DOCUMENTS

| | | | |
|---|---|---|---|
| EP | 3584120 A1 | 12/2019 | |
| JP | 2004212129 A | 7/2004 | |
| JP | 2009-275789 A | 11/2009 | |
| JP | 2013054496 A * | 3/2013 | |
| JP | 2014-21810 A | 2/2014 | |
| JP | 2016-18571 A | 2/2016 | |
| JP | 2016018571 A | 2/2016 | |
| JP | 2017-150860 A | 8/2017 | |
| JP | 2019010919 A * | 1/2019 | |
| JP | 2019-71578 A | 5/2019 | |
| WO | 2012058062 A1 | 5/2012 | |
| WO | 2018/061616 A1 | 4/2018 | |
| WO | 2018/084146 A1 | 5/2018 | |
| WO | WO-2018179297 A1 * | 10/2018 | B62J 11/22 |

OTHER PUBLICATIONS

PCT Written Opinion of the International Searching Authority dated Aug. 3, 2021 filed in PCT/JP2021/019575.
Extended European Search Report (EESR) dated Jun. 17, 2024 for EP21866306.0.
"Safety EYE Safety camera systems operating manual", Pilz Gmbh, 2011, pp. 1-166; Cited EESR.
Partial European Search Report (PESR) dated Feb. 14, 2024 for European Patent Application No. 21866306.0.
"SafetyEYE Safe camera systems", Pilz Gmbh, 2011, total 166 pages; Cited in PESR.

* cited by examiner

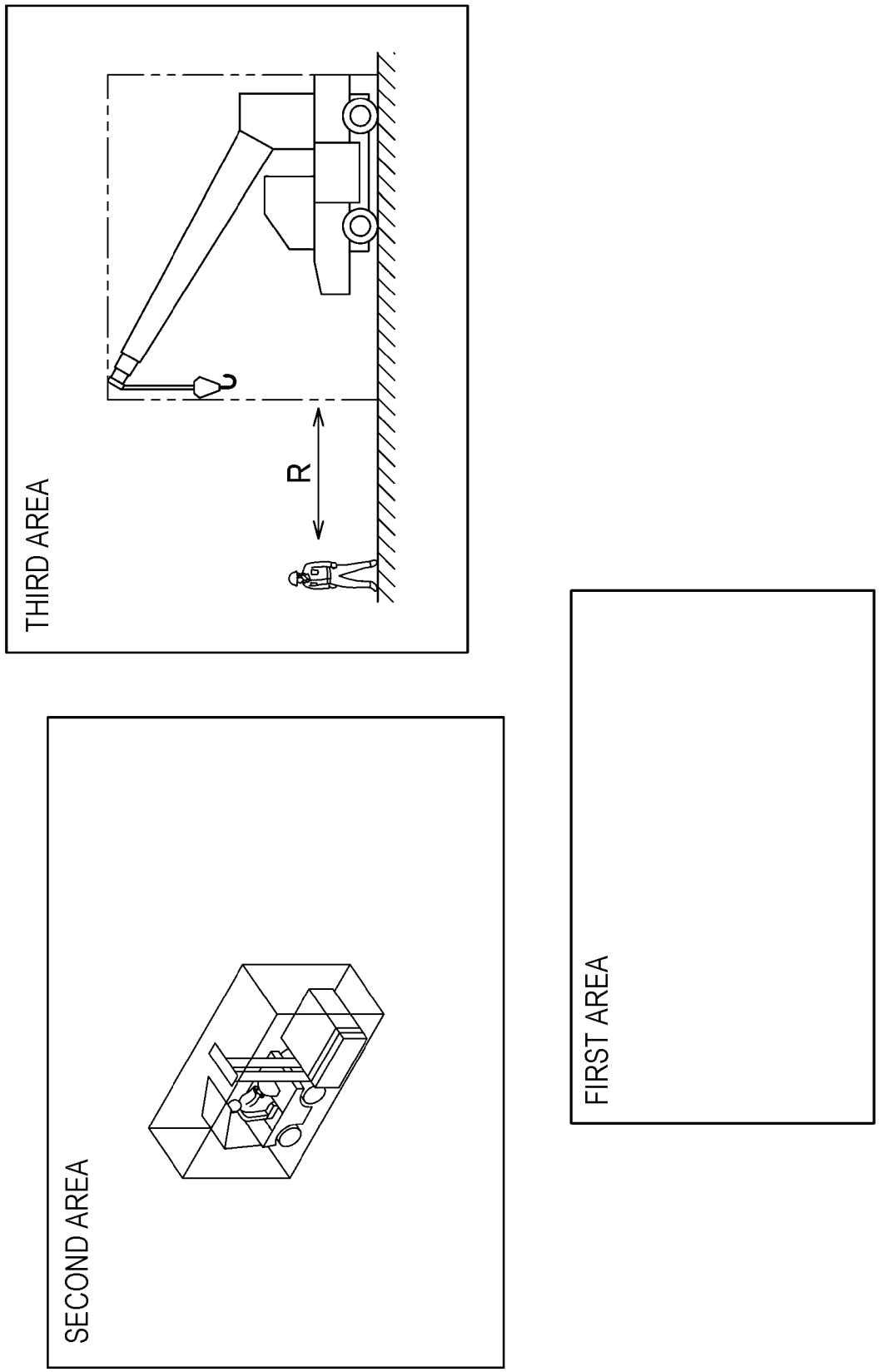

FIG. 8
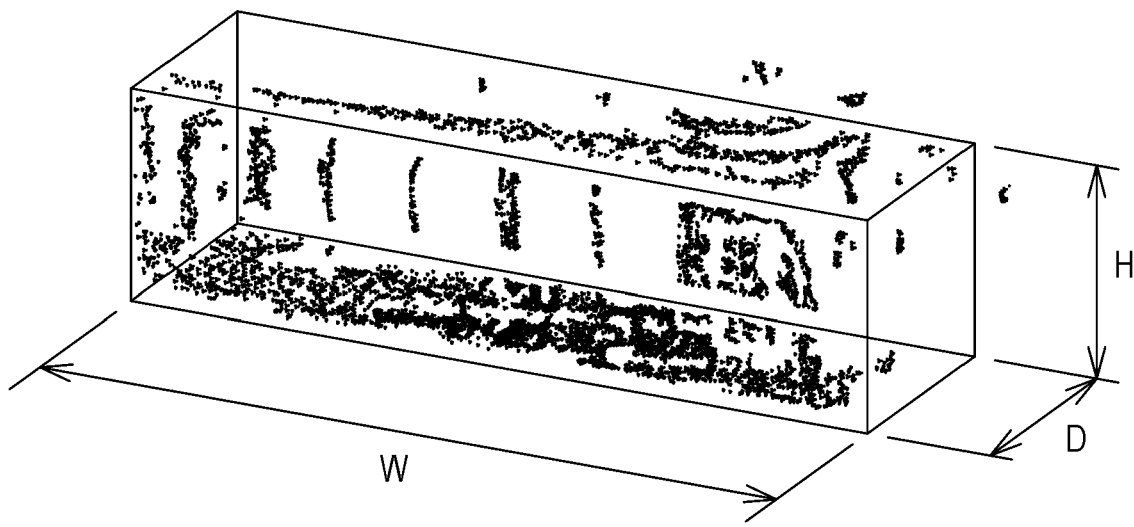
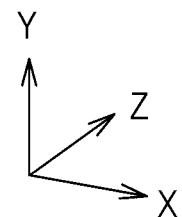
FIG. 9
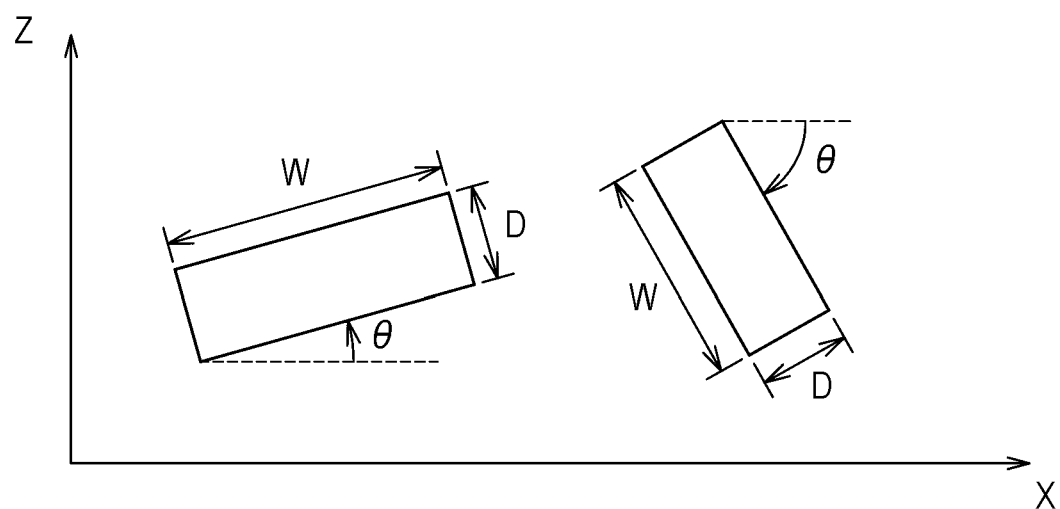

IN CASE OF $\theta=0°$

IN CASE OF $\theta=\Delta\theta$

IN CASE OF $\theta=2\times\Delta\theta$

FIG. 12

| CLASSIFICATION | WIDTH (W) | | DEPTH (D) | | HEIGHT (H) | | HEIGHT (Ht) FROM GROUND TO TOP SURFACE OF BOUNDING BOX | | HEIGHT (Hb) FROM GROUND TO LOWER SURFACE OF BOUNDING BOX | |
|---|---|---|---|---|---|---|---|---|---|---|
| | min | max | min | max | min | max | min | max | min | max |
| PERSON | 0.3 | 1.2 | 0.2 | 1.0 | 0.5 | 2.3 | 0.5 | 3.0 | -1.0 | 0.8 |
| LARGE MOVING BODY | (ALL OF EACH ITEM IS EQUAL TO OR MORE THAN min OF PERSON) & (ONE OR MORE ITEMS ARE EQUAL TO OR MORE THAN max OF PERSON) | | | | | | | | | |
| UNKNOWN | OTHER THAN ABOVE | | | | | | | | | |

FIG. 13A

| FRAME NUMBER | 500 | 501 | 502 | 503 | 504 | 505 | 506 | 507 | 508 | 509 |
|---|---|---|---|---|---|---|---|---|---|---|
| CLASSIFICATION RESULT | — | — | LARGE MOVING BODY | LARGE MOVING BODY | LARGE MOVING BODY | PERSON | LARGE MOVING BODY | PERSON | LARGE MOVING BODY | PERSON |
| ATTRIBUTE OF MOVING BODY | — | — | — | — | LARGE MOVING BODY | LARGE MOVING BODY | LARGE MOVING BODY | LARGE MOVING BODY | LARGE MOVING BODY | LARGE MOVING BODY |

FIG. 13B

| FRAME NUMBER | 500 | 501 | 502 | 503 | 504 | 505 | 506 | 507 | 508 | 509 |
|---|---|---|---|---|---|---|---|---|---|---|
| CLASSIFICATION RESULT | — | — | PERSON | PERSON | PERSON | LARGE MOVING BODY | PERSON | LARGE MOVING BODY | PERSON | LARGE MOVING BODY |
| ATTRIBUTE OF MOVING BODY | — | — | — | — | PERSON | PERSON | PERSON | PERSON | PERSON | PERSON |

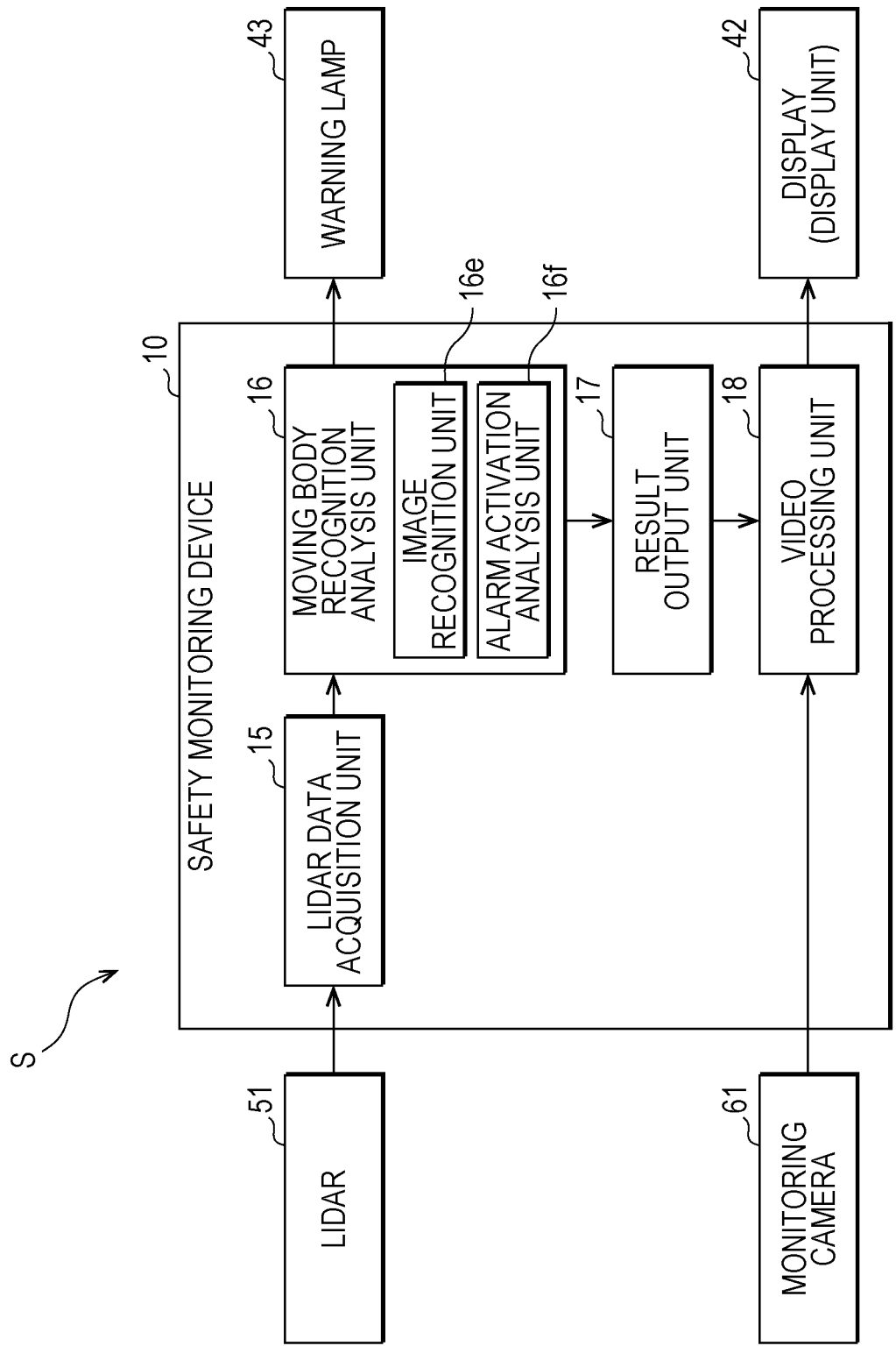

FIG. 20

| FRAME | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| ANGLE (°) | 6 | 6 | 12 | 6 | 6 | 12 | 6 | 12 | 6 | 12 | 12 | 6 | 12 | 12 | 12 |
| AVERAGE ANGLE (°) | – | – | – | – | 7.2 | 8.4 | 8.4 | 8.4 | 8.4 | 9.6 | 9.6 | 9.6 | 9.6 | 10.8 | 10.8 |

FIG. 21

| FRAME | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| ANGLE (°) | 6 | 6 | 12 | 6 | 6 | 12 | 6 | 12 | 6 | 12 | 12 | 6 | 12 | 12 | 12 |
| AVERAGE ANGLE (°) | - | - | - | - | 7.2 | 8.8 | 8 | 9.2 | 8.4 | 9.6 | 10.4 | 9.2 | 10 | 10.8 | 11.2 |

FIG. 22

```
ANGLE SMOOTHING
PROCESSING      ⊙ YES      ○ NO
EXECUTION
ASPECT RATIO (width/depth) OF           LESS THAN  1000.0  ⇕  OR
EXECUTION TARGET SIZE (width) OF EXECUTION TARGET        LESS THAN  100.0   ⇕  [m]

NUMBER OF AVERAGED FRAMES               LESS THAN  5       ⇕  OR

SMOOTHING       ⊙ SIMPLE      ○ WEIGHTED AVERAGE
METHOD            AVERAGE
```

| | TIME STAMP | CAMERA NAME | TYPE | DESCRIPTION |
|---|---|---|---|---|
| | 2020/01/17 12:55:20 | Camera01 | INTRUDER | LR 1 Area 3 |
| | 2020/01/17 12:41:53 | Camera01 | INTRUDER | LR 1 Area 3 |
| | 2020/01/17 12:13:47 | Camera01 | INTRUDER | LR 1 Area 3 |
| | 2020/01/17 12:13:46 | Camera01 | INTRUDER | LR 1 Area 3 |
| | 2020/01/17 12:08:58 | Camera01 | INTRUDER | LR 1 Area 3 |
| ★ | 2020/01/17 12:05:41 | Camera01 | CUSTOM | CUSTOM EVENT |
| | 2020/01/17 11:49:32 | Camera01 | INTRUDER | LR 1 Area 3 |
| | 2020/01/17 11:49:29 | Camera01 | INTRUDER | LR 1 Area 3 |
| | ⋮ | ⋮ | ⋮ | ⋮ |

⚑ EVENT LIST

FIG. 26

EVENT EDIT　　　　　　　　　　　　　　　X

BASIC INFORMATION

- 131 — CAMERA NAME　　Camera41-123
- 132 — USER NAME　　admin
- 133 — OCCURRENCE DATE AND TIME　　2020/01/17 12:05:41
- 134 — END DATE AND TIME　　2020/01/17　12:11:20
- 135 — DESCRIPTION (256 CHARACTERS)　　LR 1 Area 1
- 136 — TYPE　　INTRUDER
- 137 — MARK　　■★

DETAIL　　△

- 138 — CAUSE
- 139 — MEASURE
- 140 — IMPORTANCE

SAVE　CANCEL

SAFETY MONITORING DEVICE, SAFETY MONITORING METHOD, AND PROGRAM

TECHNICAL FIELD

The present invention relates to a safety monitoring device, a safety monitoring method, and a program.

BACKGROUND ART

For example, equipment such as a crane vehicle, a heavy machine, and a forklift is operated at a construction site, a factory, a warehouse, and the like. There is a plurality of dangerous spots where an accident occurs due to contact between these equipment and a person. Therefore, there is a demand for a sensing means for ensuring safety so that these equipment do not come into contact with a person. Thus, for example, techniques described in Patent Literature 1 and Patent Literature 2 have been proposed.

The technique described in Patent Literature 1 uses an object sensing sensor to sense a person by arbitrarily applying various known image processing methods, machine learning based discriminators, or the like.

The technique described in Patent Literature 2 is to obtain a distance between a person and a crane vehicle in a three-dimensional space. In the technique described in Patent Literature 2, a moving body is divided into a plurality of cubes (cuboids) using depth map data, and a distance obtained by subtracting a radius of a circumscribed sphere of each cube from a distance between center points of the two cubes is defined as the distance between the two cubes. Then, in the technique described in Patent Literature 2, the minimum value of the combinations of the distances between all the cubes is obtained as the shortest distance between the objects (the shortest distance between the person and the crane vehicle).

CITATION LIST

Patent Literature

Patent Literature 1: WO 2018/084146 A
Patent Literature 2: JP 2014-21810 A

SUMMARY OF INVENTION

Technical Problem

However, in the conventional techniques described in Patent Literature 1 and 2, it has been demanded to satisfactorily grasp a relationship between a person and an object.

For example, since the technique described in Patent Literature 1 does not describe a specific person sensing technique, the convenience is low, and it is not easy to construct a system. Therefore, the technique described in Patent Literature 1 has been demanded to satisfactorily grasp a relationship between a person and an object.

Further, in the technique described in Patent Literature 2, for example, even in a case where a person is right below a crane vehicle, there is a possibility that a risk cannot be sensed when the distance between the person and the crane vehicle is larger than a predetermined distance. That is, when a person is right below the crane vehicle, there is a possibility that the person has entered a dangerous area. In this case, even when the distance between the person and the crane vehicle is larger than a predetermined distance, there is a possibility that it is not safe. In such a case, there is a possibility that the technique described in Patent Literature 2 overlooks the unsafety. Therefore, the technique described in Patent Literature 2 has been demanded to satisfactorily grasp a relationship between a person and an object so that the unsafety is not overlooked.

The present invention has been made in view of the above-described problems of the conventional art, and an object of the present invention is to provide a safety monitoring device, a safety monitoring method, and a program capable of satisfactorily grasping a relationship between a person and an object.

Solution to Problem

The above problems of the present invention are solved by the means described below.

(1) A safety monitoring device including: an area setting unit capable of setting a plurality of alarm activation target areas with respect to a sensing target area of a safety sensor; an alarm activation type setting unit capable of setting a type of an arbitrary alarm activation function with respect to each of the alarm activation target areas; and a moving body recognition analysis unit that recognizes a motion of a moving body on the basis of sensor data measured by the safety sensor.

(2) The safety monitoring device according to (1), including: a sensor data acquisition unit that acquires three-dimensional data as the sensor data from the safety sensor, in which the moving body recognition analysis unit extracts a moving body from the sensing target area on the basis of the three-dimensional data, and senses traveling of the moving body to each of the alarm activation target areas.

(3) The safety monitoring device according to (1) or (2), in which the alarm activation type setting unit can select any two or more of: a function of issuing a warning to all moving bodies; a function of issuing a warning only to a person; a function of issuing a warning in a case where a distance between a person and a large object larger than the person is within a certain distance; a function of issuing a warning in a case where a person enters a traveling direction of the large object; an alarm activation function of issuing a warning only to a moving body at a certain speed or higher; an alarm activation function of issuing a warning only to a moving body at a certain speed or lower; a function of combining two or more arbitrary functions to obtain a logical sum; and a function of combining two or more arbitrary functions to obtain a logical product, as the type of the alarm activation function.

(4) The safety monitoring device according to any one of (1) to (3), in which the type of the alarm activation function can be designated for each area via a user interface.

(5) The safety monitoring device according to any one of (1) to (4), in which the moving body recognition analysis unit extracts point cloud data representing a moving body from three-dimensional data measured with a lidar, which is the safety sensor, and creates a bounding box having a size necessary for surrounding the point cloud data, determines a minimum value and a maximum value of each of five pieces of data including a width, a depth, and a height of the bounding box, and a height of a bottom surface and a height of a top surface of the bounding box, as a size of a person by using any one or more or all of the five pieces of data, and determines that the size of the moving body is within a determined range as a determination condition of person, and identifies the moving body as a person when the size of the moving body continuously conforms to the determination condition for an arbitrarily determined certain time.

(6) The safety monitoring device according to (5), in which the moving body recognition analysis unit: identifies a large object larger than a person by using any one or more or all of the five pieces of data including the width, the depth, and the height of the bounding box, and the height of the bottom surface and the height of the top surface of the bounding box, calculates, as a distance between the person and the large object, a distance obtained by subtracting a radius of a circumscribed circle of the bottom surface or the top surface of the bounding box of the person from a minimum value of a distance between a center of the bottom surface or the top surface of the bounding box of the person and each side of the bottom surface or the top surface of the bounding box of the large object, and issues a warning when the distance between the person and the large object becomes smaller than an arbitrarily determined certain distance.

(7) The safety monitoring device according to (6), in which the moving body recognition analysis unit issues a warning when a time during which the distance between the person and the large object becomes smaller than the certain distance continues for an arbitrarily determined certain time.

(8) The safety monitoring device according to (6) or (7), in which the moving body recognition analysis unit stops the warning when the distance between the person and the large object becomes larger than the certain distance.

(9) The safety monitoring device according to (6) or (7), in which the moving body recognition analysis unit stops the warning when a time during which the distance between the person and the large object becomes larger than the certain distance continues for arbitrarily determined certain or more time.

(10) The safety monitoring device according to any one of (6) to (9), in which the moving body recognition analysis unit changes an alarm level according to the distance between the person and the large object.

(11) The safety monitoring device according to any one of (5) to (10), in which the moving body recognition analysis unit calculates a speed of the moving body from a distance over which a center position of the bounding box has moved for a certain time.

(12) The safety monitoring device according to any one of (1) to (11), including: a video processing unit that superimposes a position of the moving body sensed by the safety sensor on video data.

(13) The safety monitoring device according to any one of (1) to (12), further including: a recording management unit that records and manages video data obtained by photographing a whole or a part of the sensing target area in a storage unit; and an event list processing unit that adds an event including alarm activation data to an event list and manages the event when a warning is issued, in which the recording management unit constantly records the video data in the storage unit, and when an arbitrary alarm activation portion is designated from the event list, the event list processing unit displays video data of a certain time before and after of the designated alarm activation portion on a display unit.

(14) The safety monitoring device according to (13), in which the event list processing unit can filter and display alarm activation data for each type with respect to the event list displayed on the display unit.

(15) The safety monitoring device according to any one of (1) to (12), further including: a recording management unit that records and manages video data of the sensing target area in a storage unit, in which the recording management unit records the video data before and after a base point in the storage unit, the base point being a time point at which an occurrence for which a warning is issued occurs according to a type of an alarm activation function.

(16) The safety monitoring device according to any one of (1) to (15), in which the alarm activation type setting unit can designate processing of sensing a feature of the moving body from video data of the sensing target area as the alarm activation function.

(17) The safety monitoring device according to (16), in which the processing of sensing the moving body includes any one of person identification by face recognition, sex determination, and posture determination.

(18) The safety monitoring device according to any one of (1) to (17), in which the safety monitoring device notifies an external device equipped with a program for performing camera video processing of warning data sensed by a set alarm activation function.

(19) The safety monitoring device according to any one of (5) to (11), including: a smoothing means that smooths an angle of the bounding box.

(20) The safety monitoring device according to (19), including: a video processing unit that performs processing according to a type of the alarm activation function with respect to the three-dimensional data, in which the video processing unit displays the point cloud data and the bounding box on a display unit simultaneously.

(21) The safety monitoring device according to (19) or (20), in which the smoothing means smooths and calculates an angle of a bottom surface of the bounding box.

(22) The safety monitoring device according to (21), in which the angle of the bottom surface of the bounding box discretely calculated by the smoothing means can be arbitrarily changed via a user interface.

(23) The safety monitoring device according to any one of (19) to (22), in which any one or both of a smoothing method of the smoothing means and a value of smoothing time can be arbitrarily changed via a user interface.

(24) The safety monitoring device according to any one of (19) to (23), in which the smoothing means smooths center coordinates of the bottom surface of the bounding box.

(25) The safety monitoring device according to any one of (1) to (24), including: a recording management unit that records video data in a storage unit by dividing the video data into files at predetermined time intervals; and an event list processing unit that creates and manages an event list selectable for each event, in which the event list processing unit performs, for an event selected by a safety monitoring person, either control not to automatically erase the file including a video within a video reproduction time range of the event or control to re-save the file in another region of the storage unit.

(26) The safety monitoring device according to (25), in which the event list processing unit has a function of automatically erasing the file on the basis of a predetermined rule, and the predetermined rule is one of securing a certain amount of free capacity of a recording means or a lapse of a certain time.

(27) The safety monitoring device according to (25) or (26), in which the event list processing unit acquires sensor data including one or both of a start time and an end time of an event occurring in the sensing target area from the safety sensor and determines the video reproduction time range of the event list.

(28) The safety monitoring device according to any one of (25) to (27), in which the event list processing unit has a function of additionally registering an arbitrary occurrence having occurred in a past as a new event in the event list.

(29) The safety monitoring device according to any one of (25) to (28), in which the event list processing unit has a function of editing a start time and an end time of the event.

(30) The safety monitoring device according to any one of (25) to (29), including: a video processing unit that performs processing corresponding to a type of the alarm activation function on video data of the sensing target area, in which the video processing unit creates a display screen for simultaneously displaying the video and the event list on a display unit, and when a specific event is designated by a safety monitoring person from the event list via a graphical user interface, displays a video including a video reproduction time range of the designated event on the display unit.

(31) The safety monitoring device according to (30), in which the event list enables an important mark for selecting presence or absence of automatic erasure of the file to be added for each event via the graphical user interface.

(32) The safety monitoring device according to (31), in which the event list processing unit performs control not to automatically erase a file including a period from a certain time before a start time of an event for which absence of automatic erasure is selected at a timing of selecting presence or absence of automatic erasure of the file and an event to which the important mark is added in advance to a certain time after an end time.

(33) The safety monitoring device according to (32), in which the event list processing unit performs control to erase the file of the event in a case where the event for which the absence of the automatic erasure is selected is changed to the event for which presence of the automatic erasure is selected or in a case where the important mark is removed from the event to which the important mark is added in advance.

(34) The safety monitoring device according to any one of (31) to (33), in which the event list processing unit performs control such that while an event of a file is deleted from the event list in a case where a file for which a predetermined time has elapsed since recording is automatically erased, an event for which absence of automatic erasure is selected at a timing of selecting presence or absence of automatic erasure of the file and an event to which the important mark is added in advance are not deleted from the event list.

(35) The safety monitoring device according to any one of (25) to (34), further including: a safety monitoring unit that monitors entry of an object into a monitoring region of the safety sensor, in which the safety monitoring unit notifies the event list processing unit of a start time and an end time of the event by setting a time when the object enters the monitoring region as the start time of the event and setting a time when the object leaves the monitoring region or a time when a certain time has elapsed from the start time of the event as the end time of the event.

(36) A safety monitoring method including: an area setting process capable of setting a plurality of alarm activation target areas with respect to a sensing target area of a safety sensor; an alarm activation type setting process capable of setting a type of an arbitrary alarm activation function with respect to each of the alarm activation target areas; and a moving body recognition analysis process that recognizes a motion of a moving body on the basis of sensor data measured by the safety sensor.

(37) A program for causing a computer to function as safety monitoring for ensuring safety of a sensing target area of a safety sensor, the program causing the computer to function as: an area setting unit capable of setting a plurality of alarm activation target areas with respect to a sensing target area of the safety sensor; an alarm activation type setting unit capable of setting a type of an arbitrary alarm activation function with respect to each of the alarm activation target areas; and a moving body recognition analysis unit that recognizes a motion of a moving body on the basis of sensor data measured by the safety sensor.

Advantageous Effects of Invention

According to the present invention, it is possible to satisfactorily grasp a relationship between a person and an object.

BRIEF DESCRIPTION OF DRAWINGS

FIG. 5 is an explanatory diagram illustrating an example of an area.

FIG. 8 is an explanatory diagram illustrating an example of coordinates and a configuration of a bounding box.

FIG. 9 is an explanatory diagram illustrating an example of a bottom surface of a bounding box.

FIG. 12 is an explanatory diagram illustrating an example of determination conditions of a person and a large object.

FIG. 13A is explanatory diagram (1) illustrating an example of attributes in consideration of a classification result and continuity of a detected moving body.

FIG. 13B is explanatory diagram (2) illustrating an example of attributes in consideration of a classification result and continuity of a detected moving body.

FIG. 18A is operation explanatory diagram (1) of a safety monitoring device according to an embodiment.

FIG. 20 is an explanatory diagram illustrating an example of angle smoothing processing.

FIG. 21 is an explanatory diagram illustrating an example of angle smoothing processing.

FIG. 22 is an explanatory diagram illustrating a setting example of angle smoothing processing.

FIG. 24 is an explanatory diagram illustrating an example of a display screen.

FIG. 25 is an explanatory diagram illustrating an example of an event list.

FIG. 26 is an explanatory diagram illustrating an example of an event editing screen.

DESCRIPTION OF EMBODIMENTS

Figure 1:
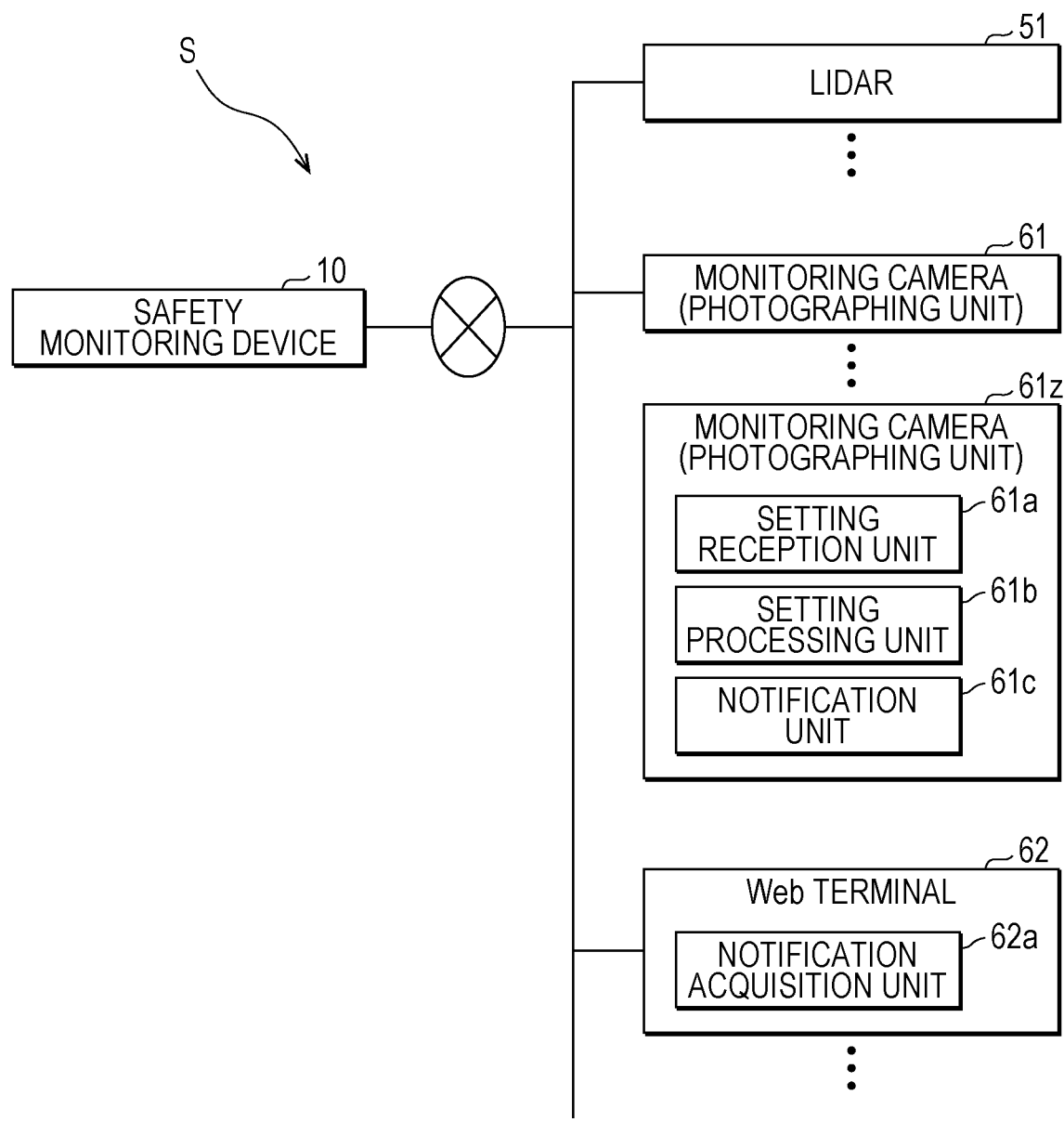
FIG. 1 is a configuration diagram of a safety monitoring system including a safety monitoring device according to an embodiment.

An embodiment of the present invention will be described in detail below with reference to the drawings. Note that the drawings are only schematically illustrated to the extent that the present invention can be sufficiently understood. Hence, the present invention is not limited only to the illustrated examples. Further, in the drawings, the same reference numerals are given to common components and similar components, and redundant description thereof will be omitted.

<Configuration of Safety Monitoring Device>

Figure 2:
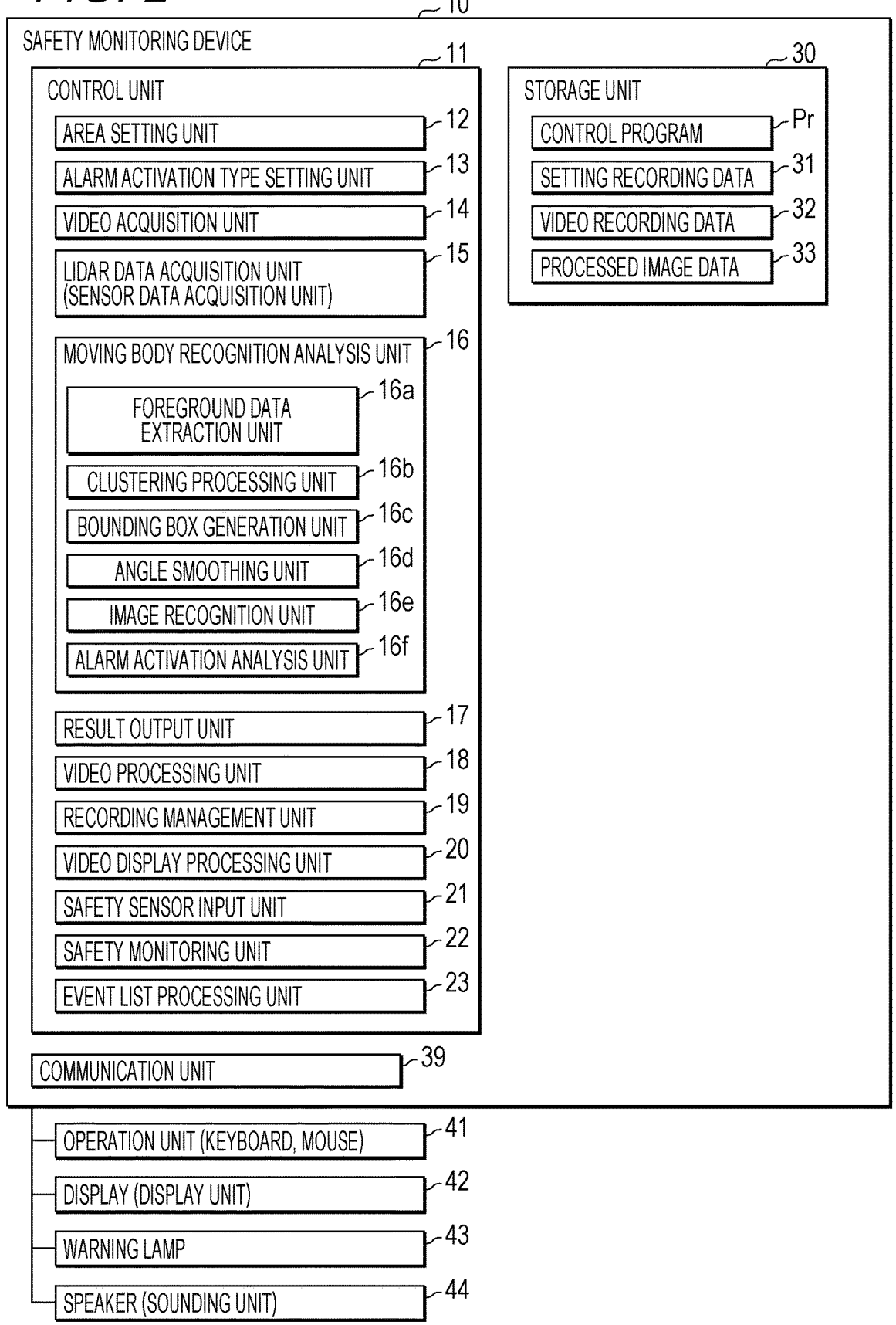
FIG. 2 is a configuration diagram of a safety monitoring device according to an embodiment.

Hereinafter, a configuration of a safety monitoring device 10 according to the present embodiment will be described with reference to FIGS. 1 and 2. FIG. 1 is a configuration diagram of a safety monitoring system S including the safety monitoring device 10 according to the present embodiment. FIG. 2 is a configuration diagram of the safety monitoring device 10.

As illustrated in FIG. 1, the safety monitoring system S includes one or a plurality of safety monitoring devices 10, one or a plurality of lidars 51, one or a plurality of monitoring cameras 61, and one or a plurality of Web terminals 62.

The safety monitoring device 10 is a device that monitors safety of a sensing target area (measurement space) of a safety sensor. The safety monitoring device 10 includes a personal computer (PC) or the like.

The lidar 51 is a three-dimensional sensor that is installed around the measurement space so as to be used as a safety sensor and senses an object.

The monitoring camera 61 is a photographing unit that is counterposed around the measurement space and photographs the measurement space. The monitoring camera 61 may be configured to include a setting reception unit 61a, a setting processing unit 61b, and a notification unit 61c like a monitoring camera 61z. The monitoring camera 61z is an external device on which a program (not illustrated) for performing camera video processing is mounted. The setting reception unit 61a is a means that receives setting of camera video processing. The setting processing unit 61b is a means that executes the camera video processing received by the setting reception unit 61a with respect to the video data. The setting processing unit 61b may be set to determine the safety of the measurement space. The notification unit 61c is a means that notifies the safety monitoring device 10 and the Web terminal 62 of the video subjected to the camera video processing and the determination result of the safety of the measurement space.

The Web terminal 62 is an external device on which a program (not illustrated) for performing camera video processing is mounted. In the present embodiment, description is given assuming that that the Web terminal 62 includes a notification acquisition unit 62a. The notification acquisition unit 62a is a means that acquires a video subjected to the camera video processing and a determination result of safety of the measurement space from the safety monitoring device 10 or the monitoring camera 61z.

As illustrated in FIG. 2, the safety monitoring device 10 includes a control unit 11, a storage unit 30, and a communication unit 39. Further, the safety monitoring device 10 further includes an operation unit 41, a display 42 (display unit), a warning lamp 43, and a speaker 44 (sounding unit).

The control unit 11 includes an area setting unit 12, an alarm activation type setting unit 13, a video acquisition unit 14, a lidar data acquisition unit 15, a moving body recognition analysis unit 16, a result output unit 17, a video processing unit 18, a recording management unit 19, a video display processing unit 20, a safety sensor input unit 21, a safety monitoring unit 22, and an event list processing unit 23.

The area setting unit 12 is a means that sets an area (for example, alarm activation target area, alarm activation exclusion area, or the like, to be described below) having an arbitrary attribute with respect to a sensing target area (measurement space) of the lidar 51, which is a safety sensor.

The alarm activation type setting unit 13 is a means that sets an arbitrary alarm activation function type for each area.

The video acquisition unit 14 is a means that acquires video data of the measurement space.

The lidar data acquisition unit 15 is a sensor data acquisition unit that acquires sensor data from the lidar 51, which is a safety sensor, arranged around the measurement space.

The moving body recognition analysis unit 16 is a means that extracts a moving body from three-dimensional data on the basis of sensor data measured by the safety sensor (the lidar 51 in the present embodiment), recognizes the motion of the moving body, analyzes a traveling direction, and issues a warning. The moving body recognition analysis unit 16 includes a foreground data extraction unit 16a, a clustering processing unit 16b, a bounding box generation unit 16c, an angle smoothing unit 16d, an image recognition unit 16e, and an alarm activation analysis unit 16f.

The foreground data extraction unit 16a is a means that extracts foreground data from the input three-dimensional data.

The clustering processing unit 16b is a means that groups data on the basis of similarity between data by unsupervised learning.

The bounding box generation unit 16c is a means that generates a bounding box. Here, the "bounding box" means a minimum rectangular or cuboidal region surrounding a certain object.

The angle smoothing unit 16d is a means that performs averaging processing with the number of frames or a processing method specified in advance.

The image recognition unit 16e is a means that recognizes an image from the video data. The image recognition unit 16e is a means that performs person determination by face identification, sex determination, posture determination, and the like.

The alarm activation analysis unit 16f is a means that performs processing according to the type of the alarm activation function using the result of moving body detection in the clustering processing and issues a warning.

The result output unit 17 is a means that sends an issued warning as a result of sensing of the moving body by the moving body recognition analysis unit 16 to the video processing unit 18 as event data.

The video processing unit 18 is a means that creates a display screen to be displayed on the display 42. The video processing unit 18 can perform processing such as superimposing the event data on the video data. For example, the video processing unit 18 can perform arbitrary camera video processing such as superimposing a person sensing frame on the camera video.

The recording management unit 19 is a means that records and manages the video data in the storage unit.

The video display processing unit 20 is a means that processes a file divided at predetermined time intervals to create a video and displays the video on the display 42.

The safety sensor input unit 21 is a means that inputs a signal output from a safety sensor such as a lidar, a camera, a human sensor, or a touch sensor.

The safety monitoring unit 22 is a means that monitors entry of an object into a monitoring region. The event list processing unit 23 is a means that creates and manages an event list selectable for each event. Note that the event list includes alarm activation data, custom data, and the like as events.

The storage unit 30 stores a control program Pr, setting recording data 31, video recording data 32, and processed image data 33.

The control program Pr is a program that causes a computer to function as the safety monitoring device 10.

The setting recording data 31 is data set in the safety monitoring device 10 via a user interface. The video recording data 32 is video data photographed by the monitoring camera 61.

The processed image data 33 is image data obtained by performing arbitrary processing on the video data.

<Setting of Area>

Figure 3:
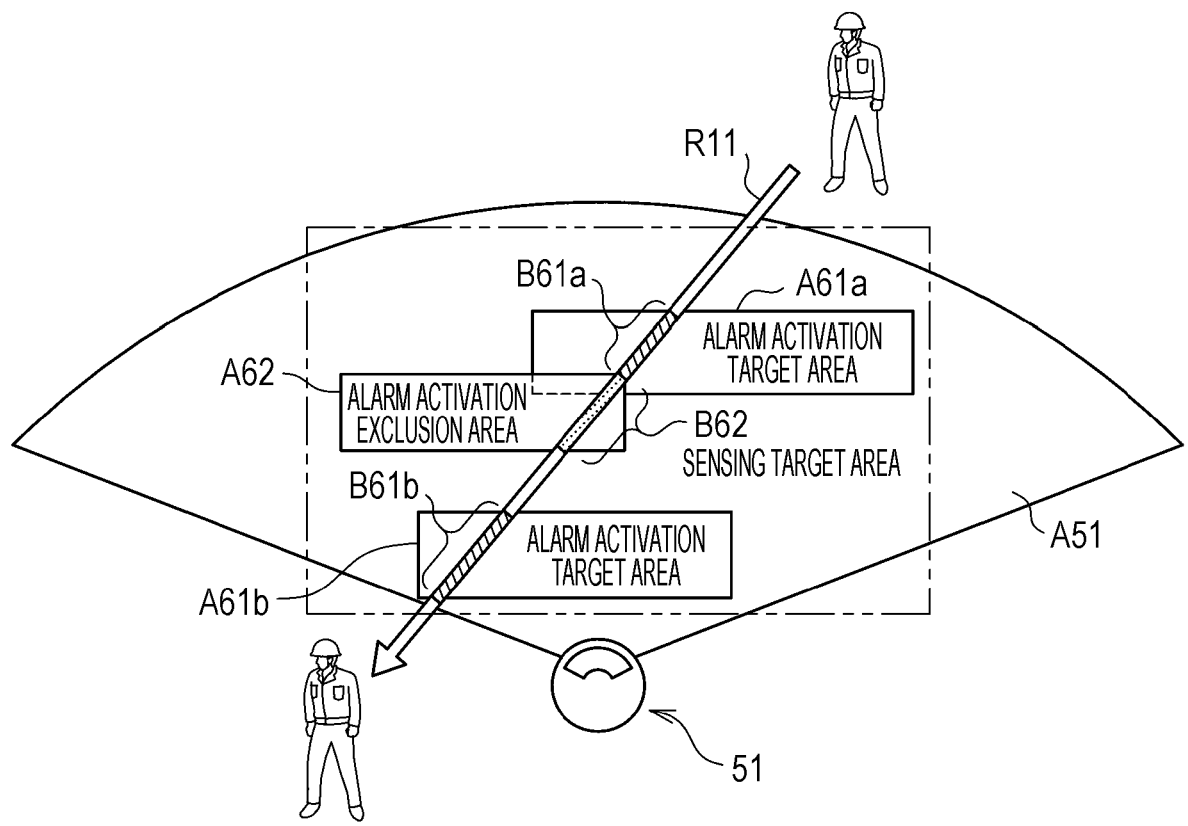
FIG. 3 is an explanatory diagram of an alarm activation target area and an alarm activation exclusion area.

Hereinafter, setting of an area will be described with reference to FIG. 3. FIG. 3 is an explanatory diagram of an alarm activation target area and an alarm activation exclusion area.

The area setting unit 12 of the safety monitoring device 10 sets the alarm activation target area and the alarm activation exclusion area for the sensing target area (measurement space).

The sensing target area is a measurement space in which an object is measured by the lidar 51. In other words, the sensing target area is an area where the movement of the moving body present within a sensible range of the lidar 51 is monitored by the safety monitoring device 10.

The alarm activation target area is an area in which an event is issued (warning is issued) when an entering person is sensed. The event is data indicating that a warning has been issued. The safety monitoring device 10 continues to issue a warning while an entering person is present in the alarm activation target area. Further, the safety monitoring device 10 does not issue a warning even when a moving body is sensed outside the alarm activation target area. A plurality of alarm activation target areas can be set. Setting of the alarm activation target area is valid only in the sensing target area. Note that when the alarm activation target area is set to overlap the alarm activation exclusion area, the alarm activation exclusion area is prioritized, and thus the safety monitoring device 10 does not issue a warning.

The alarm activation exclusion area is an area in which an event is not issued (warning is not issued) even when an entering person is sensed. The alarm activation exclusion area is designated when sensing of a moving body is intentionally excluded from the monitoring target. The safety monitoring device 10 does not sense an entering person or issue an event (issue a warning) within the range designated as the alarm activation exclusion area even within the range of the sensing target area or the alarm activation target area. For example, when there is a tree in the sensing target area and there is a possibility that the tree is erroneously sensed as an entering object due to swaying of the tree by wind, the safety monitoring device 10 can prevent erroneous sensing by setting the area around the tree as the alarm activation exclusion area. A plurality of alarm activation exclusion areas can be set.

As illustrated in FIG. 3, the area setting unit 12 can set a plurality of alarm activation target areas for one sensing target area (measurement space). In the example illustrated in FIG. 3, two alarm activation target areas A61a and A61b are set for the sensing target area (measurement space) indicated by the two-dot chain line. Note that although only one alarm activation exclusion area A62 is set in the example illustrated in FIG. 3, the area setting unit 12 can set a plurality of alarm activation exclusion areas for one sensing target area (measurement space).

In the example illustrated in FIG. 3, when the person moves along a walking route R11, a portion where the walking route R11 and the alarm activation exclusion area A62 overlap is set as an exclusion portion B62. Then, a portion where the walking route R11 and an alarm activation target area A61a overlap, the portion being a portion not overlapping the alarm activation exclusion area A62 is set as an alarm activation portion B61a. Furthermore, a portion where the walking route R11 and the alarm activation target areas A61b overlap is set as an alarm activation portion B61b. The safety monitoring device 10 issues an event (issues a warning) when or while a person enters the alarm activation portions B61a and B61b.

Figure 4A:
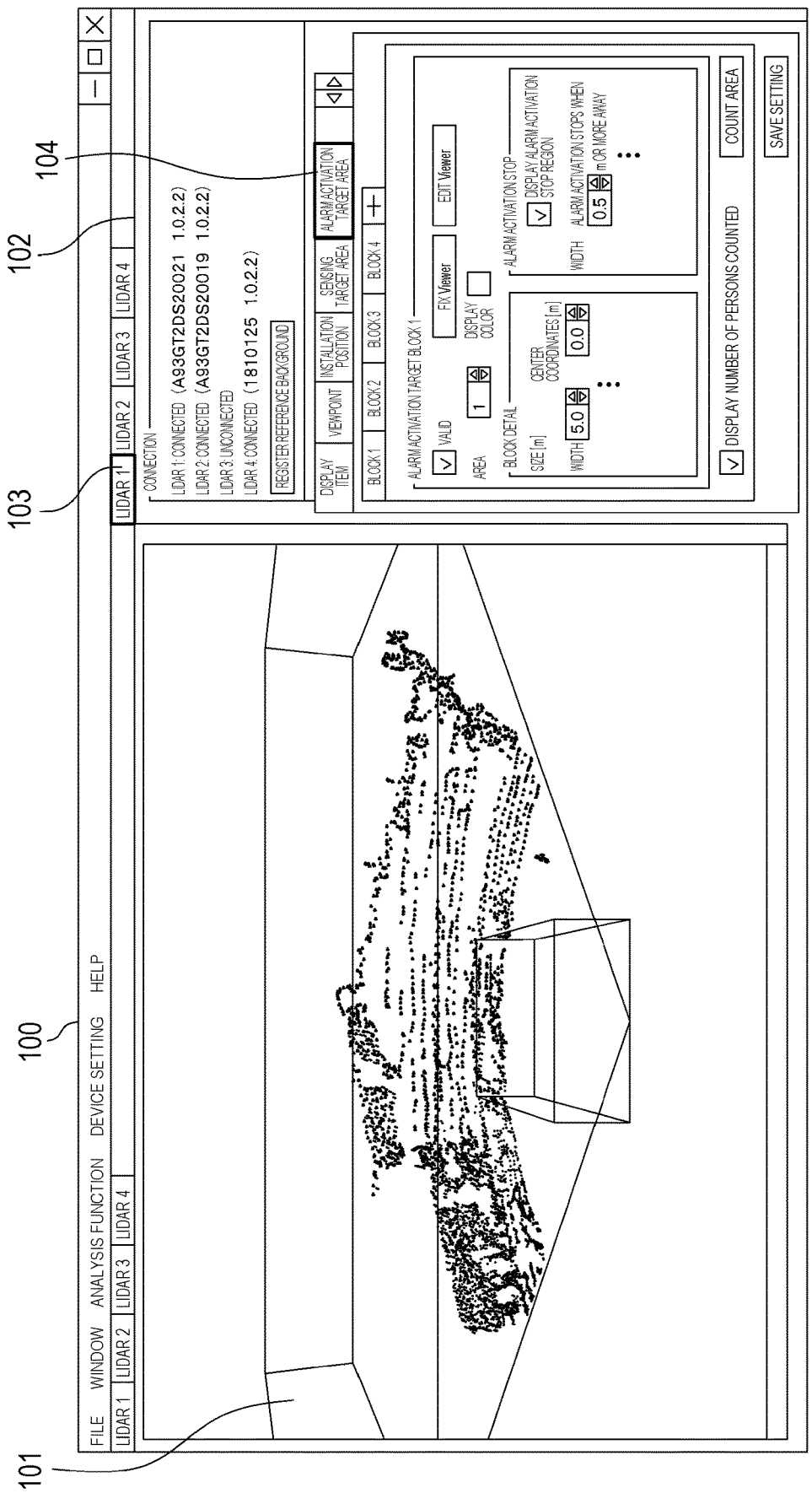
FIG. 4A is explanatory diagram (1) of a display screen of a safety monitoring device according to an embodiment.
Figure 4B:
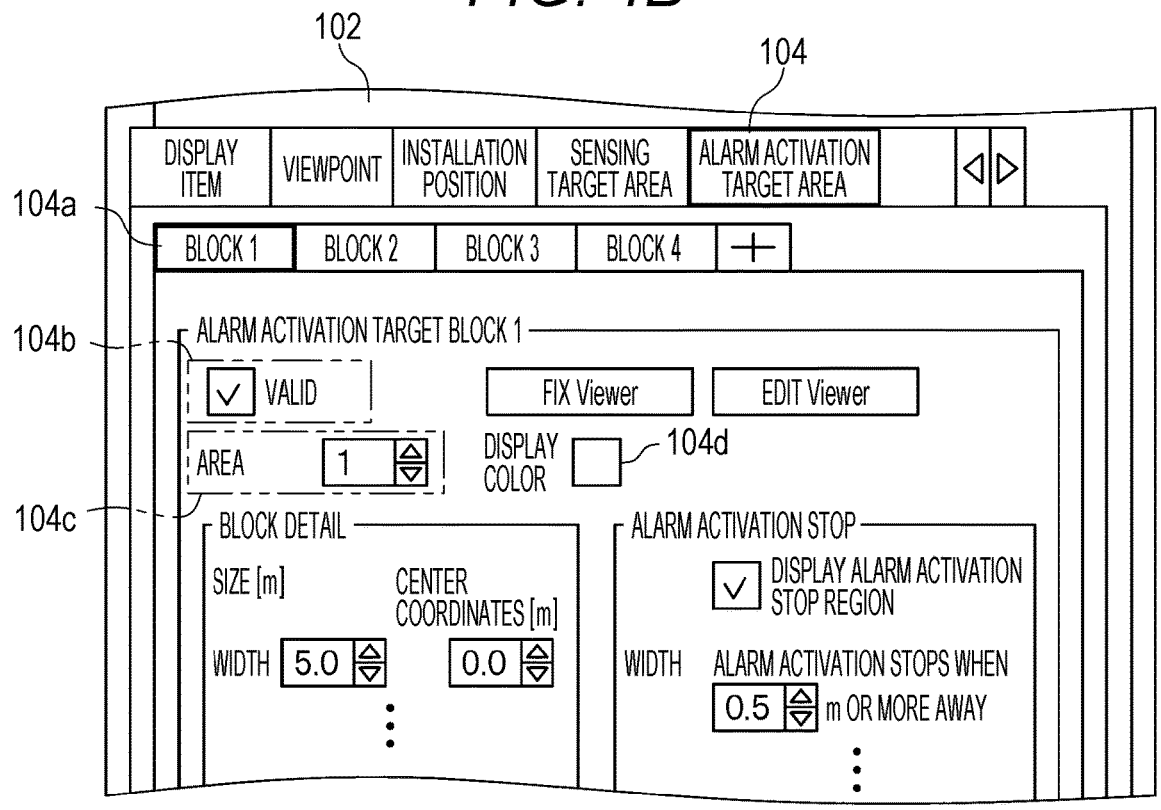
FIG. 4B is explanatory diagram (2) of a display screen of a safety monitoring device according to an embodiment.
Figure 4C:
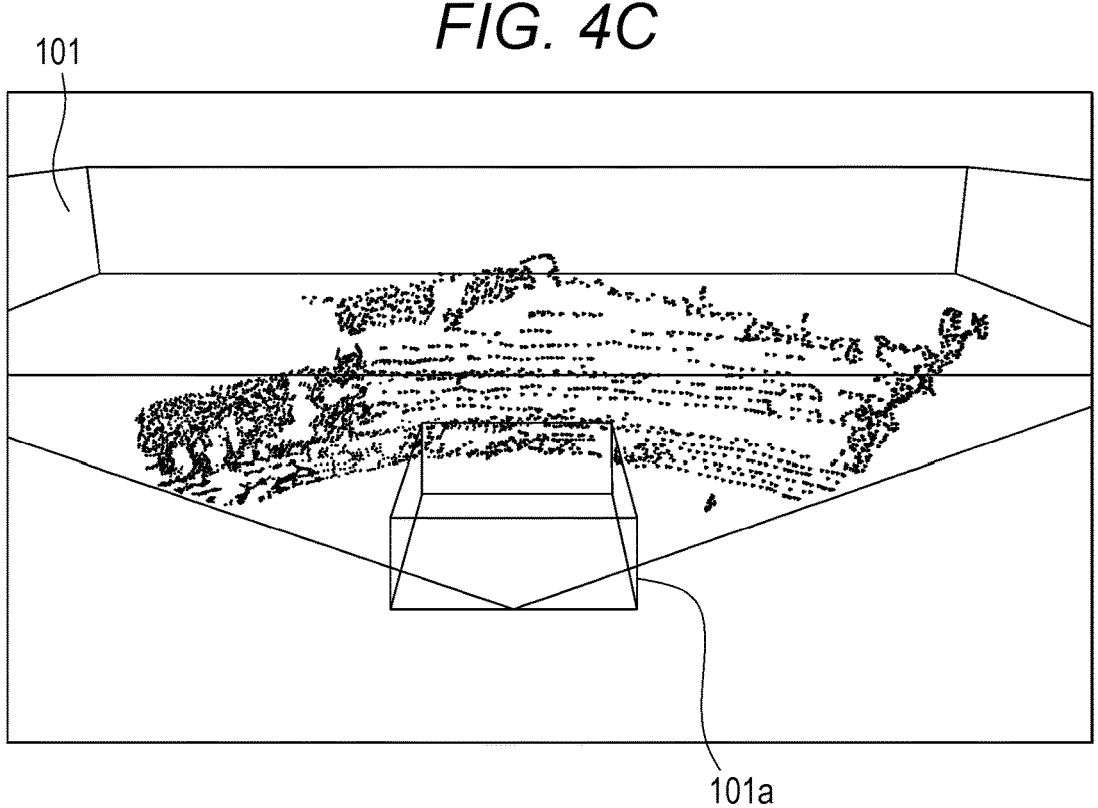
FIG. 4C is explanatory diagram (3) of a display screen of a safety monitoring device according to an embodiment.

FIGS. 4A to 4C illustrate an example of setting of an area. FIGS. 4A to 4C are each an explanatory diagram of a display screen 100 of the safety monitoring device 10. The safety monitoring device 10 displays the display screen 100 on the display 42 and accepts the setting of area by a safety monitoring person. Here, the "safety monitoring person" means a person who monitors the safety of each measurement space by the safety monitoring device 10.

In the example illustrated in FIG. 4A, the display screen 100 includes a 3D viewer unit 101, a setting unit 102, a lidar selection unit 103, an alarm activation target area tab 104, and the like.

The 3D viewer unit 101 is a field for displaying a video of the measurement space photographed by the monitoring camera 61 and an image obtained by processing the video.

The setting unit 102 is a field for performing various settings such as an area and the type of an alarm activation function.

The lidar selection unit 103 is an instruction unit that selects three-dimensional data (distance measurement data) acquired by an arbitrary lidar 51.

The alarm activation target area tab 104 is a tab for setting an alarm activation target area.

In the example illustrated in FIG. 4B, the screen of the alarm activation target area tab 104 is configured to include a block tab 104a, a validity check box 104b, an area selection unit 104c, a display color setting unit 104d, and the like.

The block tab 104a is a tab for setting the specifications of the bounding box to be added to an object for which alarm activation is performed. Here, the "bounding box" means a minimum rectangular or cuboidal region surrounding a certain object.

The validity check box 104b is a field for designating addition of a bounding box to an object for which alarm activation is performed.

The area selection unit 104c is a field for selecting an area to be set as the alarm activation target area. The display color setting unit 104d is a field for setting an alarm activation target area frame 101a (see FIG. 4C) shown in the 3D viewer unit 101.

When the safety monitoring person selects (designates) an arbitrary area using the area selection unit 104c, the safety monitoring device 10 sets the selected area as the alarm activation target area. At this time, the safety monitoring device 10 changes the color of the alarm activation target area frame 101a (see FIG. 4C) shown in the 3D viewer unit 101 to the color set by the display color setting unit 104d.

<Alarm Activation Function>

The safety monitoring device 10 has various types of alarm activation functions. Here, for example, a case where the safety monitoring device 10 uses the three types of alarm activation functions described below will be described as an example.

(1) Entry sensing: issuing a warning to all moving bodies that have entered an alarm activation target area (entry prohibited area).

(2) Entry sensing (person): issuing a warning only to a "person" among moving bodies that have entered an alarm activation target area (entry prohibited area).

(3) Proximity sensing: issuing a warning when a "person" and a "large object" that have entered an alarm activation target area (entry prohibited area) become equal to or less than a preset certain distance.

Figure 6:
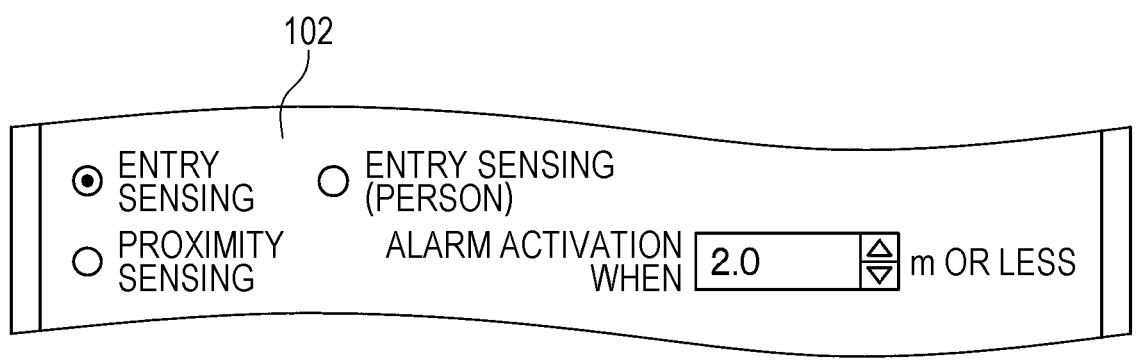
FIG. 6 is an explanatory diagram illustrating an example of selection of an alarm activation function by a user interface.

Hereinafter, a usage example of the alarm activation function will be described with reference to FIGS. 5 and 6. FIG. 5 is an explanatory diagram illustrating an example of an area. FIG. 6 is an explanatory diagram illustrating an example of selection of an alarm activation function by a user interface.

For example, in the example illustrated in FIG. 5, three areas: a first area, a second area, and a third area are set for one measurement space.

The first area is an empty area. Therefore, the safety monitoring person can set an arbitrary alarm activation function for the first area according to the operation. Thus, for example, the safety monitoring person can set "(1) entry sensing" for the first area and set the first area so that any moving body is a sensing target.

The second area is a forklift work place, and is an area that is dangerous for a person entering. Thus, the safety monitoring person sets "(2) entry sensing (person)" for the second area.

The third area is a crane work site, and is an area that is dangerous when a person comes closer to the crane with respect to a certain distance R. Thus, the safety monitoring person sets "(3) proximity sensing" for the third area in order to issue a warning to a person who is closer to the crane with respect to the certain distance R.

As illustrated in FIG. 6, the display screen 100 (see FIG. 4A) of the safety monitoring device 10 is configured such that the setting unit 102 can select one of these three types of alarm activation functions.

Further, the display screen 100 (see FIG. 4A) of the safety monitoring device 10 is configured to be able to select a plurality of alarm activation target areas (entry prohibited areas), and each area can be independently set as an area having an arbitrary attribute.

<Creation of Bounding Box>

Figure 7:
FIG. 7 is an explanatory diagram illustrating an example of point cloud data (L-shape shape data) of a bus and a bounding box.
Figure 10A:
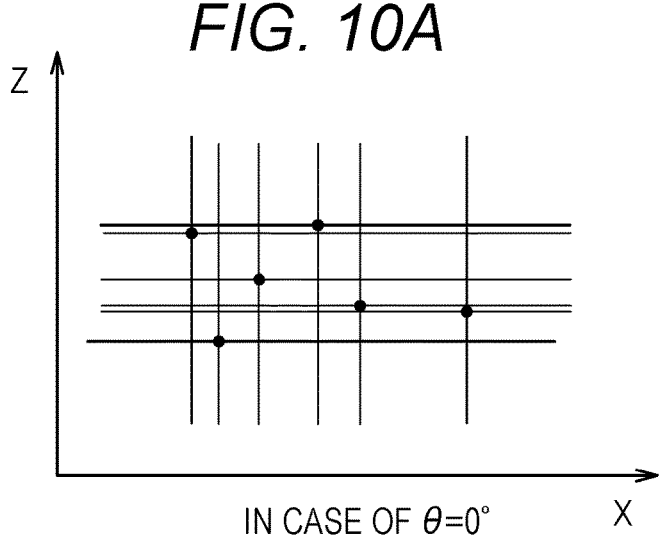
FIG. 10A is explanatory diagram (1) of a method for obtaining a rectangle of a plane (x, z), which is a bottom surface of a bounding box.
Figure 10B:
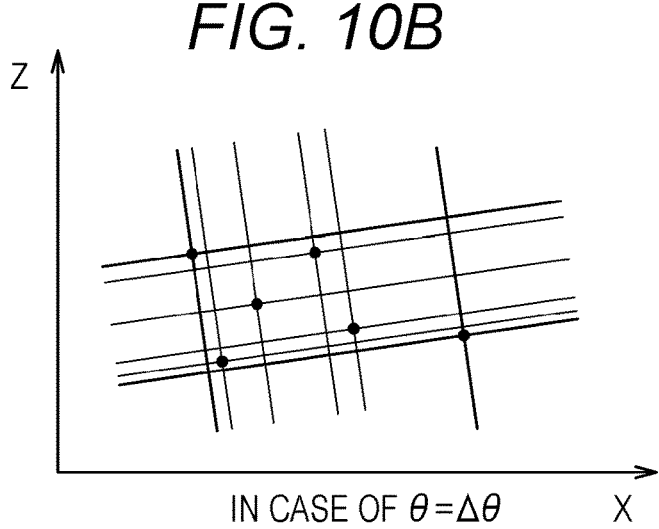
FIG. 10B is explanatory diagram (2) of a method for obtaining a rectangle of a plane (x, z), which is a bottom surface of a bounding box.
Figure 10C:
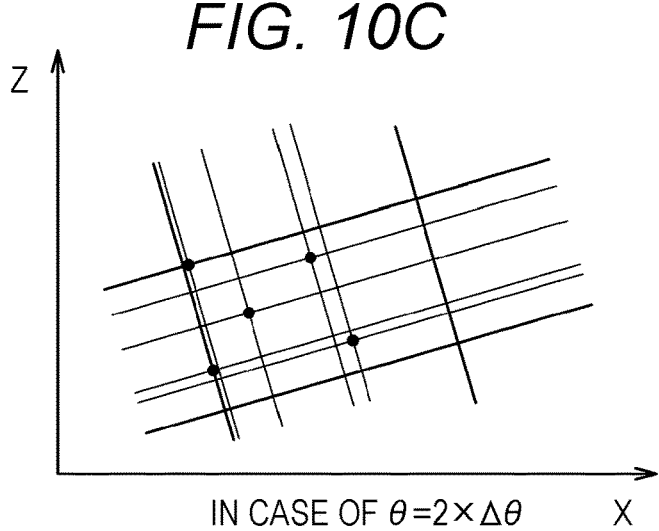
FIG. 10C is explanatory diagram (3) of a method for obtaining a rectangle of a plane (x, z), which is a bottom surface of a bounding box.

Hereinafter, the creation of the above-described "bounding box" will be described with reference to FIGS. 7 to 10C. FIG. 7 is an explanatory diagram illustrating an example of point cloud data of a bus and a bounding box. FIG. 8 is an explanatory diagram illustrating an example of coordinates and a configuration of a bounding box. FIG. 9 is an explanatory diagram illustrating an example of a bottom surface of a bounding box. FIGS. 10A to 10C are each an explanatory diagram of a method for obtaining a rectangle of a plane (x, z), which is a bottom surface of a bounding box.

The bounding box is created, for example, by the method described in Patent Literature 1 (WO 2018/084146 A) described above. FIG. 7 illustrates an example of point cloud data (L-shape shape data) of a bus measured by the lidar 51 and a bounding box having a rectangular shape formed so as to surround the point cloud data. Further, FIG. 8 illustrates an example of coordinates and configuration of a bounding box having a rectangular shape formed along the three-dimensional shape of the bus.

In a three-dimensional coordinate system (x, y, z), a horizontal plane is defined as (x, z), and a height direction is defined as a y coordinate. The bounding box includes a minimum rectangular or cuboidal region surrounding a certain object. A length in a long direction of the bottom surface is a width W (Width), a length in a narrow direction is a depth D (Depth), and a length from the bottom surface to the top surface is a height H (Height).

FIG. 9 illustrates an example of the bottom surface of the bounding box of the bus disposed to be inclined with respect to the X axis. In the example illustrated in FIG. 9, the angle formed with the X axis is indicated as an angle θ.

FIGS. 10A to 10C each illustrate a method for obtaining a rectangle of a plane (x, z), which is a bottom surface of a bounding box. In the drawings, a pixel point indicated by a black circle (hereinafter, referred to as a "black circle pixel point") represents each pixel of a point cloud subjected to clustering processing.

In FIGS. 10A to 10C, first, straight lines passing through black circle pixel points and having an inclination of an angle θ are drawn, and the outermost straight line is doubled in the X-axis direction of the bounding box at the angle θ. Next, straight lines passing through black circle pixel points and having an inclination of an angle θ+90° are drawn, and the outermost straight line is doubled in the Z-axis direction of the bounding box at the angle θ. Finally, a rectangle surrounded by these four straight lines is defined as a bounding box at the angle θ.

This procedure is repeated θ=0°, Δθ, 2×Δθ, 3×Δθ, . . . , (n−1)×Δθ (here, n is a maximum integer satisfying ((n−1)×Δθ)<90°), and a bounding box is obtained (calculated) at each inclination.

Then, among the obtained bounding boxes of each inclination, a bounding box having the largest correlation with the point cloud data is set as an optimal bounding box of the point cloud data. In this way, a bounding box of each monitoring target is created.

<Relationship between Moving Body and Bounding Box>

Figure 11:
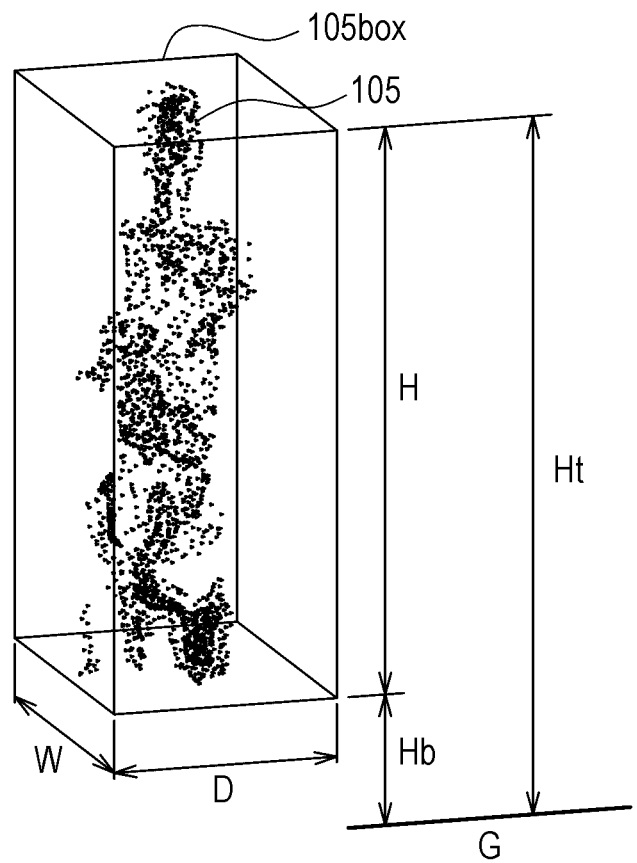
FIG. 11 is an explanatory diagram illustrating an example of a bounding box.

Hereinafter, the relationship between the moving body and the bounding box will be described with reference to FIGS. 11 to 13B. FIG. 11 is an explanatory diagram illustrating an example of a bounding box. FIG. 12 is an explanatory diagram illustrating an example of determination conditions of a person and a large object. FIG. 13A is an explanatory diagram illustrating an example of attributes (in the case of a large object) in consideration of a classification result and continuity of a detected moving body. FIG. 13B is an explanatory diagram illustrating an example of attributes (in the case of a person) in consideration of a classification result and continuity of a detected moving body.

As illustrated in FIG. 11, the safety monitoring device 10 senses a moving body 105 with the lidar 51, and generates a bounding box 105box having a cuboidal region (rectangular region) shape so as to just surround (surround with a minimum volume) the moving body 105.

The safety monitoring device 10 determines whether the moving body 105 surrounded by the bounding box 105box is a person or a large object larger than the person from the size (width, depth, height) of the bounding box 105box. The determination is made on the basis of, for example, determination conditions illustrated in FIG. 12.

In the example illustrated in FIG. 12, values of the width W, the depth D, and the heights H, Ht, and Hb of the moving body 105 are illustrated as determination conditions. Note that the height H is a distance from the top surface to the lower surface of the bounding box 105box. Further, the height Ht is a distance from a ground G to the top surface of the bounding box 105box. Further, the height Hb is a distance from the ground G to the lower surface of the bounding box 105box.

For example, in each item of the width W, the depth D, and the heights H, Ht, and Hb of the moving body 105 shown in a certain frame of a series of video data, the safety monitoring device 10 classifies the moving body 105 as "person" in a case where all the values conform to the determination conditions of "person" described below. However, the ranges described below are merely an example, and can be changed depending on the operation.

(Determination Conditions of "Person")

Width W: a range from a minimum value of 0.3 [m] to a maximum value of 1.2 [m].

Depth D: a range from a minimum value of 0.2 [m] to a maximum value of 1.0 [m].

Height H: a range from a minimum value of 0.5 [m] to a maximum value of 2.3 [m].

Height Ht: a range from a minimum value of 0.5 [m] to a maximum value of 3.0 [m].

Height Hb: a range from a minimum value of −1.0 [m] to a maximum value of 0.8 [m].

Specifically, in the width W, the depth D, and the heights H, Ht, and Hb of the moving body 105 shown in a certain frame of a series of video data, the safety monitoring device 10 classifies the moving body 105 as "person" in a case where all the values of the items are within the ranges described below.

0.3 [m]≤width W≤1.2 [m]
0.2 [m]≤depth D≤1.0 [m]
0.5 [m]≤height H≤2.3 [m]
0.5 [m]≤height Ht≤3.0 [m]
−1.0 [m]≤height Hb≤0.8 [m]

Further, for example, in each item of the width W, the depth D, and the heights H, Ht, and Hb of the moving body 105, the safety monitoring device 10 classifies the moving body 105 as "large object" in a case where each value conforms to determination conditions of "large object" described below. However, the ranges described below are merely an example, and can be changed depending on the operation.

(Determination Conditions of "Large Object")

In the items of the width W, the depth D, and the heights H, Ht, and Hb of the moving body 105, all of the items are equal to or larger than the minimum value of "person", and one or more items are equal to or larger than the maximum value of "person".

Specifically, in the width W, the depth D, and the heights H, Ht, and Hb of the moving body 105 of a certain frame (bounding box 105box), when the value of each item satisfies a first condition and a second condition described below, the safety monitoring device 10 classifies the moving body 105 as "large object".

(First Condition)

All values of the items satisfy the conditions described below.

0.3 [m]≤width W
0.2 [m]≤depth D
0.5 [m]≤height H
0.5 [m]≤height Ht
−1.0 [m]≤height Hb (Second Condition)

The value of any one or more items satisfies the conditions described below.

1.2 [m]≤width W
1.0 [m]≤depth D
2.3 [m]≤height H
3.0 [m]≤height Ht
0.8 [m]≤height Hb Further, in each item of the width W, the depth D, and the heights H, Ht, and Hb of the moving body 105, the safety monitoring device 10 classifies the moving body 105 as unknown (others) in a case where each value does not conform to the determination conditions of person or the determination conditions of large object.

Note that the safety monitoring device 10 preferably sets a threshold value to be large in consideration of a case where a plurality of persons is detected as one object. Further, the safety monitoring device 10 preferably sets a threshold value to be large in consideration of a case where the moving body 105 appears to float from the ground, such as a case where only the upper body of a person is visible.

Further, as described above, the safety monitoring device 10 can perform classification into three types: "person", "large object", and "unknown (others)" for each frame. However, the moving body sensed by the lidar 51 is split at the time of clustering processing due to measurement variation, or the size varies. Therefore, a large object may instantaneously become a mass of a person's size. In this way, there is a possibility that a large object is classified as "person". Thus, for example, as illustrated in FIG. 13A, the safety monitoring device 10 preferably classifies the attribute of the moving body 105 as "large object (large moving body)" in a case where the size of the moving body 105 is continuously maintained for a plurality of arbitrarily determined frames. In this way, the safety monitoring device 10 can prevent a large object from being classified as "person".

Note that, in the example illustrated in FIG. 13A, the safety monitoring device 10 classifies the attribute of the moving body 105 as "large object (large moving body)" in a case where the size of the moving body 105 is continuously maintained for three frames. Thereafter, the safety monitoring device 10 maintains the attribute of the moving body 105 as "large object (large moving body)" unless three frames of another attribute (for example, "person") size continue.

Further, there is a case where a moving body 501 classified as "person" instantaneously becomes a mass having a size larger than a person (or a mass having a size smaller than a person) due to the influence of some noise. In this case, for example, as illustrated in FIG. 13B, since the continuity of the moving body 501 is interrupted, it is sufficient if the attribute of the moving body 501 is reviewed only when a plurality of arbitrarily determined frames (for example, three frames) continues.

Note that, in the lidar 51 at 10 fps (frames/second), since the time of one frame is 0.1 seconds, three frames correspond to 0.3 seconds. Here, the case where three frames are continuous has been described, but the optimum number of frames may be selected according to the site.

Further, the safety monitoring device 10 may provide an alarm activation target area (entry prohibited area) within the measurement range of the lidar 51, and issue a warning only when the moving body 501 identified as "person" enters the alarm activation target area.

<Operation of Safety Monitoring Device>

Figure 14:
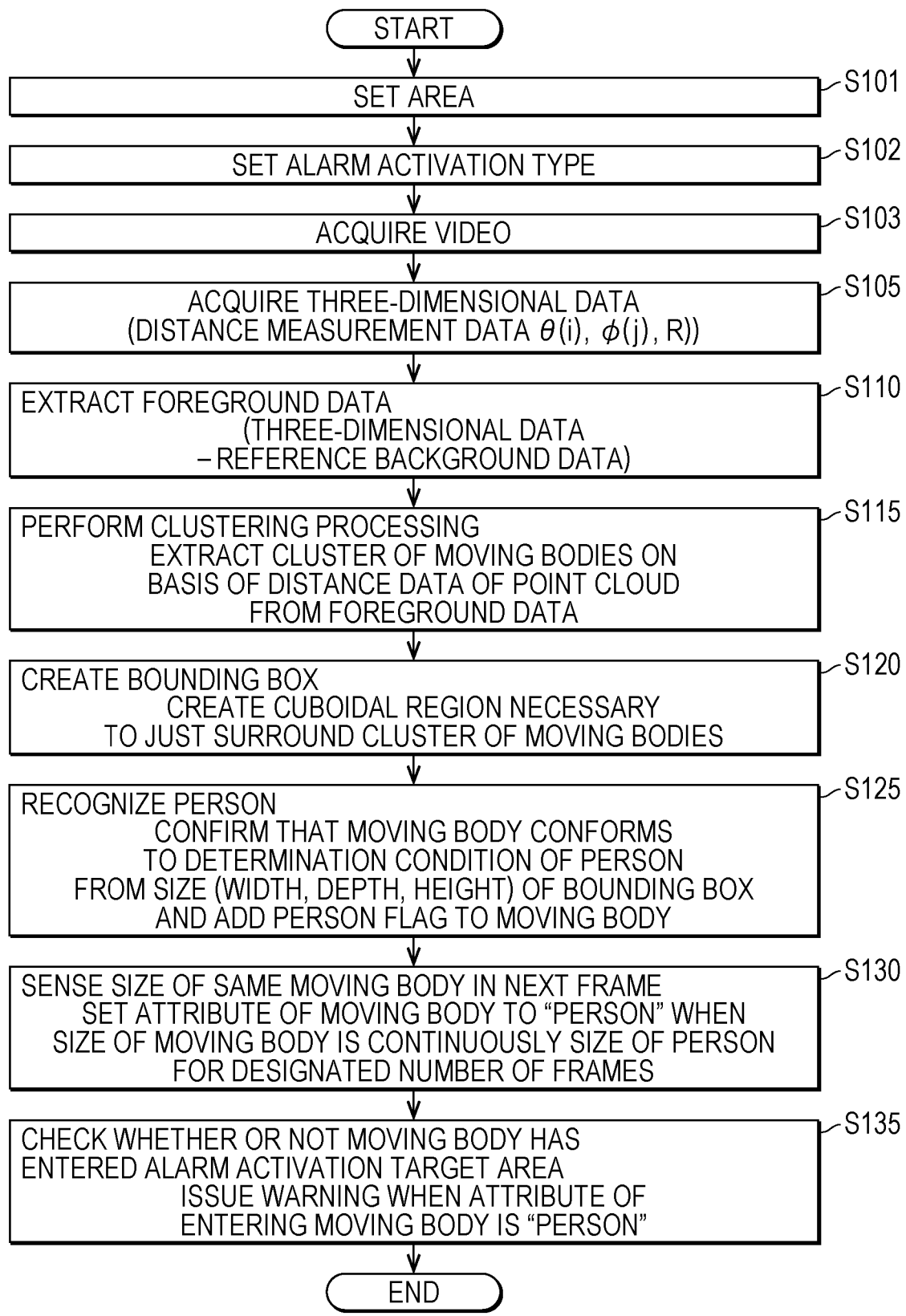
FIG. 14 is a flowchart illustrating an operation at the time of person sensing and alarm activation.

Hereinafter, the operation of the safety monitoring device 10 will be described with reference to FIG. 14. FIG. 14 is a flowchart illustrating an operation at the time of person sensing and alarm activation.

As illustrated in FIG. 14, in step S101, the safety monitoring person operates the safety monitoring device 10 while viewing the display screen 100 (see FIG. 4A) and sets an area having an arbitrary attribute with respect to the measurement space. In response to this, the area setting unit 12 of the safety monitoring device 10 sets one or a plurality of alarm activation target areas and one or a plurality of alarm activation exclusion areas for one measurement space.

Next, in step S102, the safety monitoring person operates the safety monitoring device 10 while viewing the display screen 100 (see FIG. 4A) and designates the type of an alarm activation function with respect to each alarm activation target area. In response to this, the alarm activation type setting unit 13 of the safety monitoring device 10 sets the type of the alarm activation function with respect to each alarm activation target area. Thereafter, the safety monitoring person operates the safety monitoring device 10 and instructs the safety monitoring device 10 to start monitoring the measurement space.

Then, in step S103, the video acquisition unit 14 of the safety monitoring device 10 acquires video data of each measurement space from each monitoring camera 61.

Next, in step S105, the lidar data acquisition unit 15 of the safety monitoring device 10 acquires distance measurement data ($\theta(i)$, $\varphi(j)$, R) as three-dimensional data (sensor data) from the lidar 51.

Next, in step S110, the foreground data extraction unit 16a of the moving body recognition analysis unit 16 of the safety monitoring device 10 extracts foreground data from three-dimensional data by the background subtraction method. That is, the foreground data extraction unit 16a extracts the foreground data by calculating (three-dimensional data−reference background data).

Next, in step S115, the clustering processing unit 16b of the moving body recognition analysis unit 16 of the safety monitoring device 10 extracts a cluster of point cloud data (moving bodies) from the foreground data on the basis of the distance data of the point cloud sensed using the three-dimensional data, and performs the clustering processing.

Next, in step S120, the bounding box generation unit 16c of the moving body recognition analysis unit 16 of the safety monitoring device 10 creates a bounding box by creating a cuboidal region necessary to surround the cluster of the point cloud data (moving bodies) subjected to the clustering processing.

Next, in step S125, the alarm activation analysis unit 16f of the moving body recognition analysis unit 16 of the safety monitoring device 10 confirms whether or not the moving body conforms to the determination conditions of person from the size (width, depth, height) of the bounding box. In a case where it is confirmed that the moving body conforms to the determination conditions of person, the alarm activation analysis unit 16f adds (sets) a flag (person flag) representing a person to the moving body. In this way, the safety monitoring device 10 recognizes a person with respect to the moving body.

Next, in step S130, the alarm activation analysis unit 16f of the moving body recognition analysis unit 16 of the safety monitoring device 10 senses the same size of the same moving body in a next frame. Then, when the size of the moving body continuously conforms to the size of the person for the designated number of frames, the alarm activation analysis unit 16f sets the attribute of the moving body to "person".

Next, in step S135, the alarm activation analysis unit 16f of the moving body recognition analysis unit 16 of the safety monitoring device 10 checks whether or not the moving body has entered the alarm activation target area. Then, in a case where there is an entering moving body, and when the attribute of the entering moving body is "person", the alarm activation analysis unit 16f issues a warning.

<Distance Sensing Method>

Figure 15:
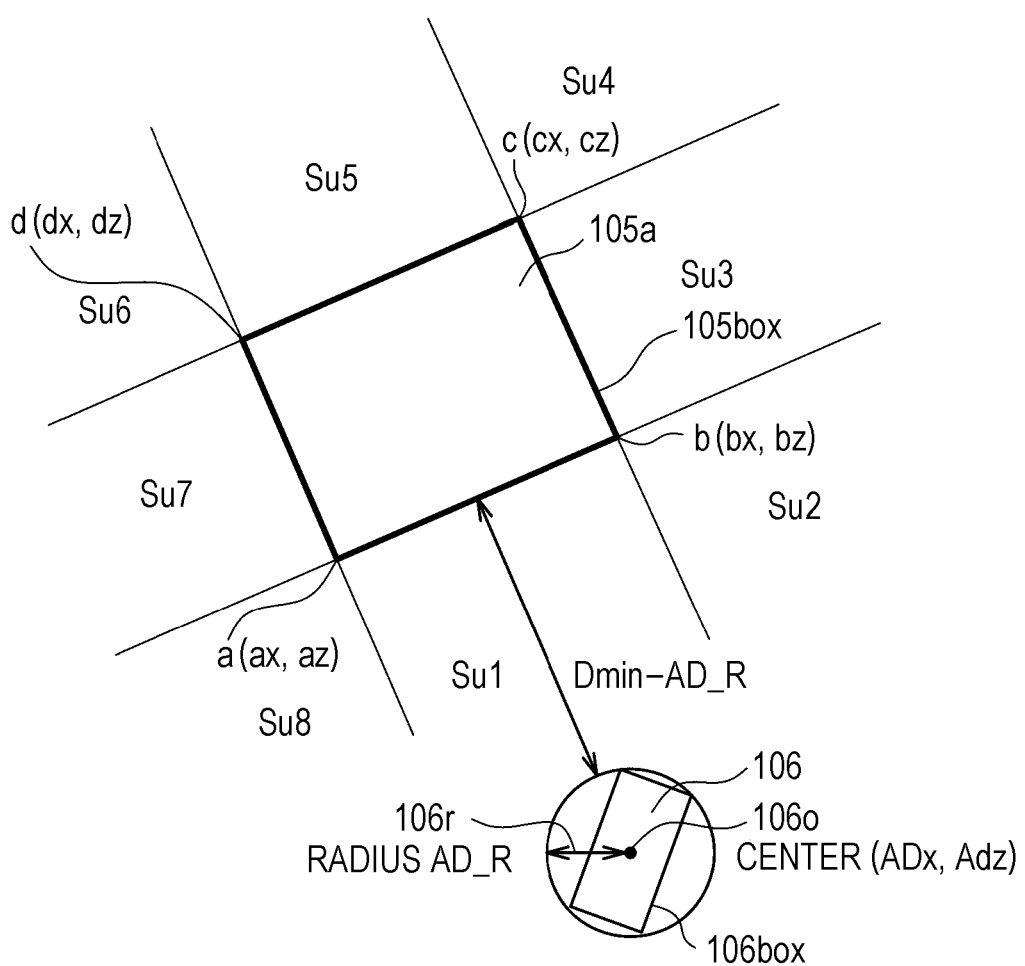
FIG. 15 is an explanatory diagram illustrating an example of a distance between a person and a large object viewed from above.

Hereinafter, a distance sensing method will be described with reference to FIG. 15. FIG. 15 is an explanatory diagram illustrating an example of a distance between a "person" and a "large object" viewed from above.

The safety monitoring device 10 can obtain (calculate) the distance between the classified "person" and "large object" as described below.

As illustrated in FIG. 15, the bottom surface of a bounding box 106box of a person 106 does not become an extreme rectangle. Therefore, the safety monitoring device 10 sets a circumscribed circle surrounding the bounding box 106box as the region of the person 106.

In a case where the horizontal axis is the X axis and the vertical axis is the Z axis, the coordinates of a center point 106o of the bounding box 106box of the person 106 can be expressed as (ADx, ADz). Then, the radius of the circumscribed circle surrounding the bounding box 106box is set as AD_R.

The bottom surface of a large object 105a has a rectangular shape with four points a, b, c, and d as vertices. The safety monitoring device 10 obtains (calculates) a distance between a line segment ab of the large object 105a and the center point 106o of the person 106, a distance between a line segment bc of the large object 105a and the center point 106o of the person 106, a distance between a line segment cd of the large object 105a and the center point 106o of the person 106, and a distance between a line segment da of the large object 105a and the center point 106o of the person 106. Then, the safety monitoring device 10 sets the minimum value of the obtained (calculated) values as a distance Dmin between each of the line segments ab, bc, cd, and da and the center point 106o of the person 106.

The safety monitoring device 10 can obtain (calculate) the distance between the person 106 and the large object 105a by (Dmin–AD_R).

It is sufficient if the safety monitoring device 10 calculates the distances of all the combinations between all the detected persons 106 and the large object 105a in each frame, and issue a warning when the calculated distances are shorter than the designated threshold value distance.

At that time, the safety monitoring device 10 may issue different types of warnings depending on the calculated distances. For example, in a case where the calculated distances are threshold value distances Th1, Th2, and Th3 (not illustrated) described below, the warnings described below can be issued. Note that the threshold value distances Th1, Th2, and Th3 (not illustrated) have a relationship of Th1>Th2>Th3.

(1) In the case of (Dmin–AD_R)<Th1, the safety monitoring device 10 sets the level as a caution level. In this case, the safety monitoring device 10 causes the warning lamp 43 to light up yellow.

(2) In the case of (Dmin–AD_R)<Th2, the safety monitoring device 10 sets the level as a warning level. In this case, the safety monitoring device 10 causes the warning lamp 43 to light up red.

(3) In the case of (Dmin–AD_R)<Th3, the safety monitoring device 10 sets the level as a danger level. In this case, the safety monitoring device 10 causes the warning lamp 43 to blink in red and causes the speaker 44 to sound an alarm sound.

Figure 16:
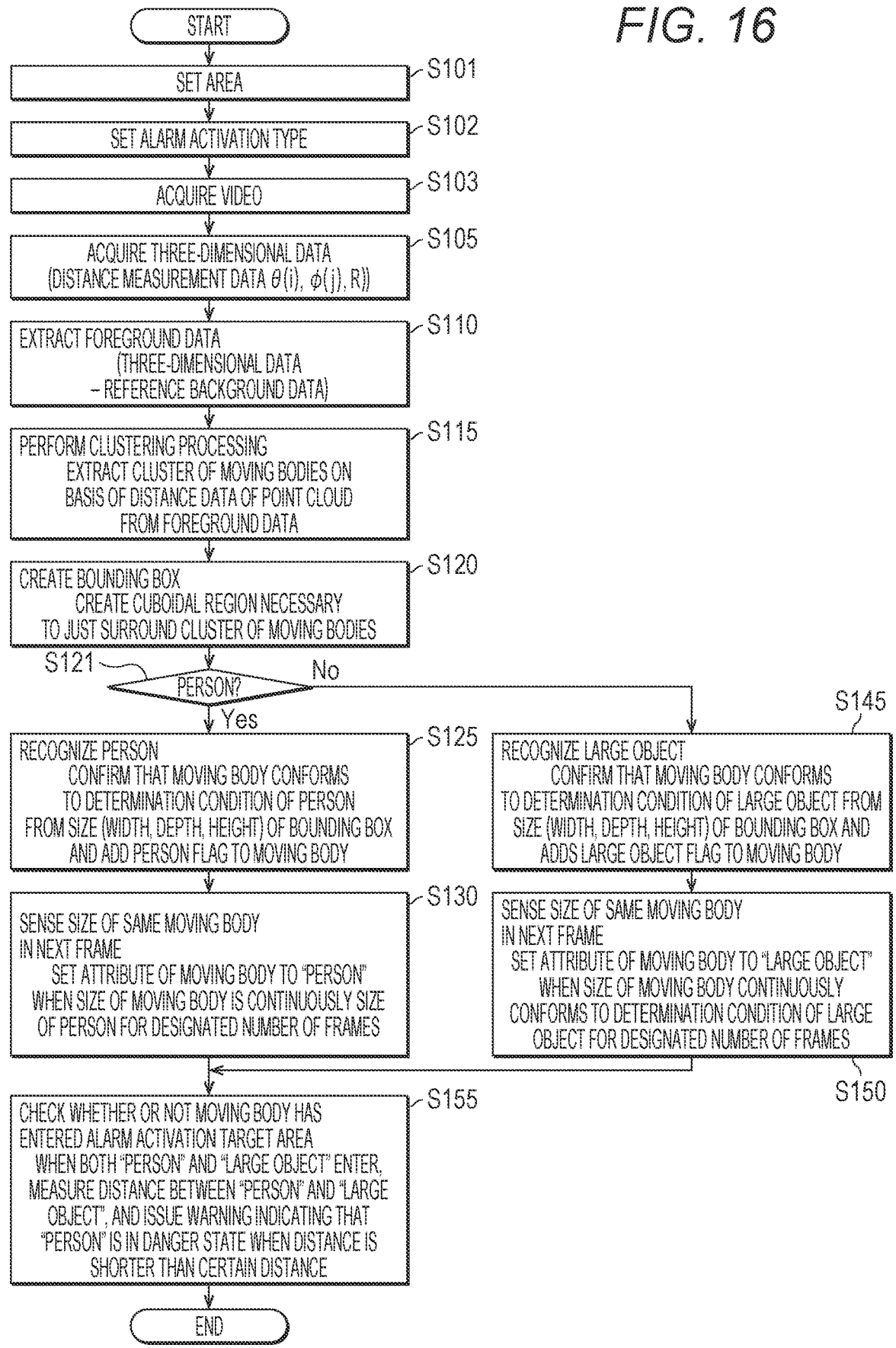
FIG. 16 is a flowchart illustrating an operation at the time of person and large object sensing and alarm activation.

Hereinafter, the operation of the safety monitoring device 10 will be described with reference to FIG. 16. FIG. 16 is a flowchart illustrating an operation at the time of person and large object sensing and alarm activation.

As illustrated in FIG. 16, the operation at the time of person and large object sensing and alarm activation is different from the operation at the time of person sensing and alarm activation illustrated in FIG. 14 on the points described below.

(1) Point that determination processing of step S121 is performed after step S120.

(2) Point that the processing proceeds to step S125 when "Yes" is determined in the determination of step S121.

(3) Point that the safety monitoring device 10 performs the processing of step S145 and step S150 when "No" is determined in the determination of step S121.

(4) Point that step S135 is deleted, and instead, the processing of step S155 is performed after step S130 or step S150.

Except for these differences, the operation at the time of person and large object sensing and alarm activation illustrated in FIG. 16 is the same as the operation at the time of person sensing and alarm activation illustrated in FIG. 14.

Specifically, as illustrated in FIG. 16, after step S120, in step S121, the alarm activation analysis unit 16f of the moving body recognition analysis unit 16 of the safety monitoring device 10 determines whether or not the object is a person.

When it is determined in step S121 that the object is a person ("Yes"), the processing proceeds to step S125. In this case, the processing from step S125 to step S130 is performed similarly to the operation at the time of person sensing and alarm activation illustrated in FIG. 14. After step S130, the processing proceeds to step S155.

On the other hand, when it is determined in step S121 that the object is not a person ("No"), the processing proceeds to step S145.

In step S145, the alarm activation analysis unit 16f of the moving body recognition analysis unit 16 of the safety monitoring device 10 confirms that the moving body conforms to the determination conditions of large object from the size (width, depth, height) of the bounding box, and adds (sets) a flag (large object flag) representing a large object to the moving body. In this way, the safety monitoring device 10 recognizes a large object with respect to the moving body.

Next, in step S150, the alarm activation analysis unit 16f of the moving body recognition analysis unit 16 of the safety monitoring device 10 senses the size of the same moving body in a next frame. Then, when the size of the moving body continuously conforms to the determination conditions of large object for the designated number of frames, the alarm activation analysis unit 16f sets the attribute of the moving body to "large object". After step S150, the processing proceeds to step S155.

In step S155, the alarm activation analysis unit 16f of the moving body recognition analysis unit 16 of the safety monitoring device 10 checks whether or not the moving body has entered the alarm activation target area. Then, when both the "person" and the "large object" enter the alarm activation target area, the alarm activation analysis unit 16f measures a distance between the "person" and the "large object", and issues a warning that the "person" is in a dangerous state when the distance is shorter than a certain distance.

Figure 17:
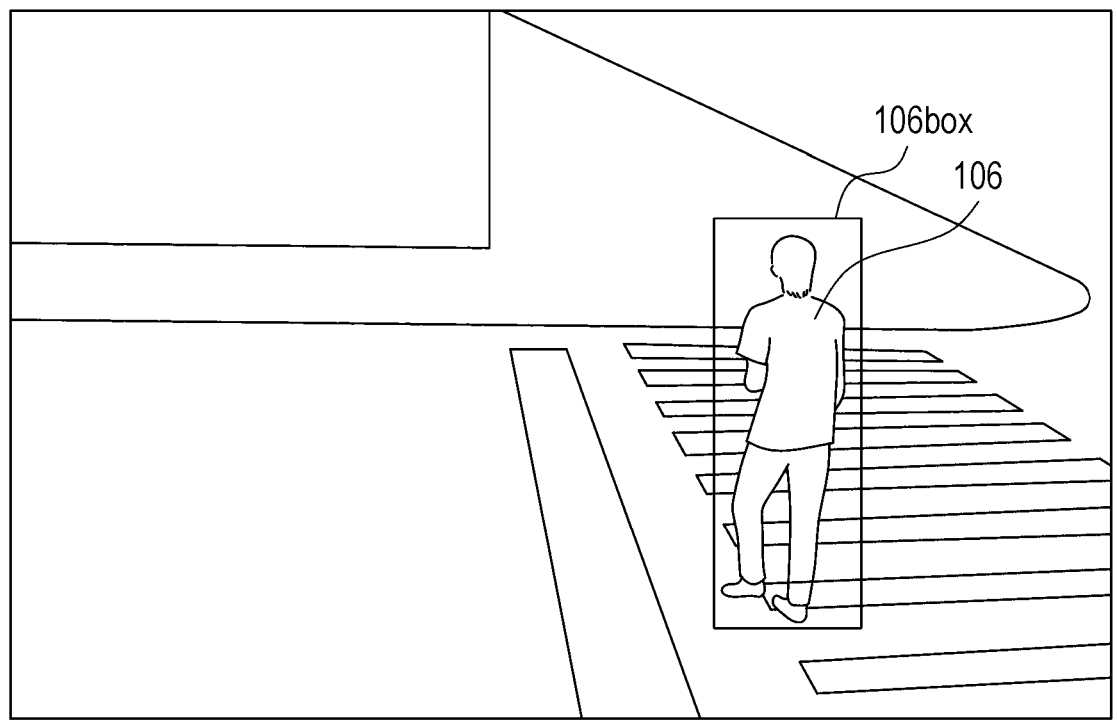
FIG. 17 is an explanatory diagram illustrating an example of a warning screen when a person sensed by a lidar enters an alarm activation target area (entry prohibited area) of a camera video.

FIG. 17 is an explanatory diagram illustrating an example of a warning screen when the person 106 sensed by the lidar 51 enters an alarm activation target area (entry prohibited area) of a camera video. The safety monitoring device 10 projects the three-dimensional data acquired from the lidar 51 onto the two-dimensional video data (camera video) acquired from the monitoring camera 61. The safety monitoring device 10 is set such that the three-dimensional data and the video data match in positional relationship. Then, as illustrated in FIG. 17, the safety monitoring device 10 senses a moving body, adds the bounding box 106box to the moving body, and recognizes the moving body as the person 106 on the basis of the size of the bounding box 106box. Note that it is sufficient if the safety monitoring device 10 changes the color of the bounding box 106box of the corresponding person 106 in the camera video to red or superimpose a red frame on the portion of the corresponding person 106 in order to issue a warning when the person 106 enters the alarm activation target area (entry prohibited area).

Further, the safety monitoring device 10 can be configured to constantly record (video-record) the video data (camera video) acquired from the monitoring camera 61 in the storage unit 30. Such a safety monitoring device 10 can create an alarm activation list by leaving the video data (camera video) at the moment of issuing the warning in the record without erasing the video data. In this case, the safety monitoring device 10 can designate and reproduce (display on the display 42) the video data (camera video) at the time of alarm activation for a necessary time on the basis of the alarm activation list.

Figure 18B:
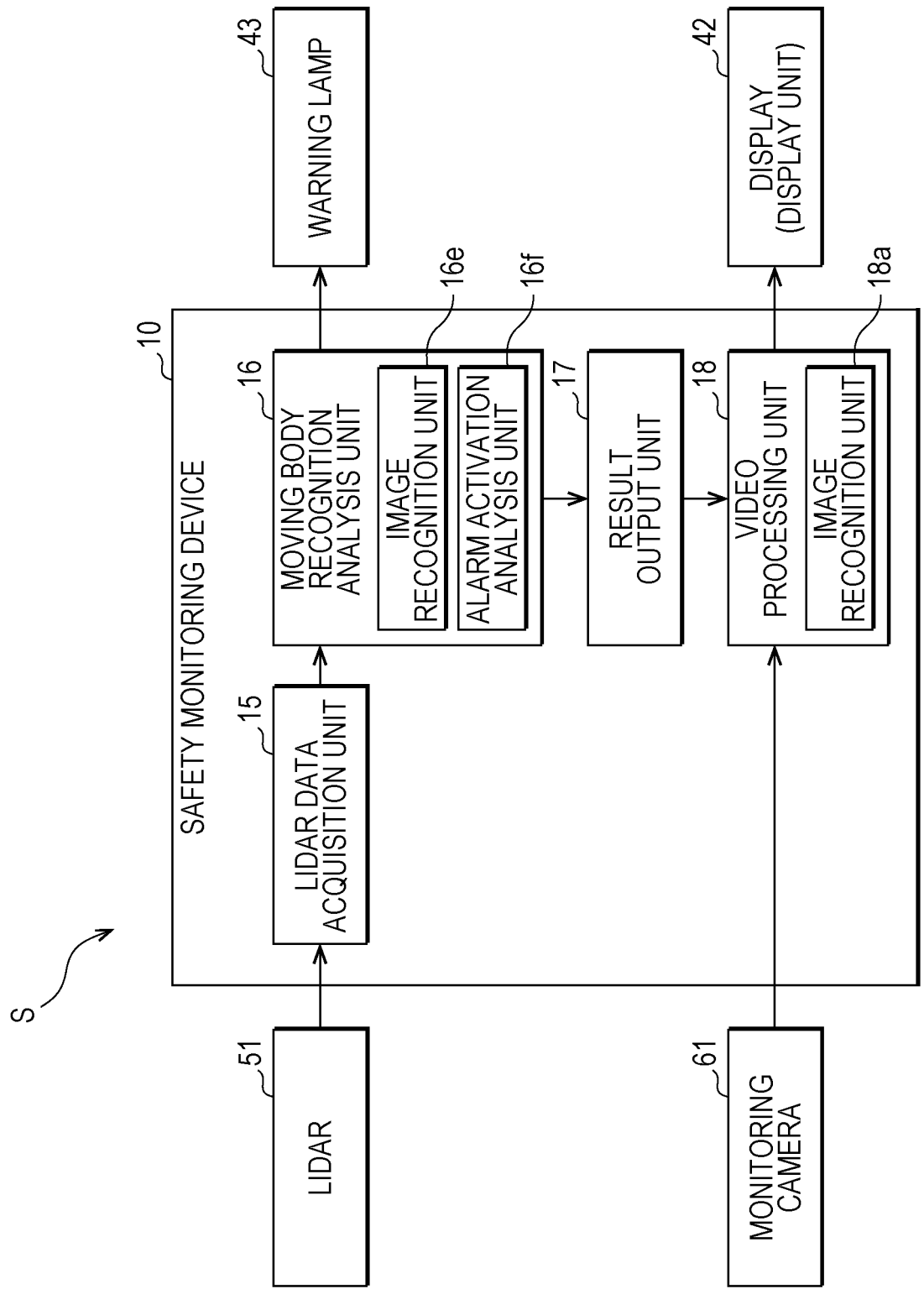
FIG. 18B is operation explanatory diagram (2) of a safety monitoring device according to an embodiment.

Further, the safety monitoring device 10 can be configured to operate as illustrated, for example, in FIG. 18A or 18B. FIGS. 18A and 18B are operation explanatory diagrams of the safety monitoring device 10.

As illustrated in FIG. 18A, the safety monitoring device 10 acquires three-dimensional data (distance measurement data) measured by the lidar 51 with the lidar data acquisition unit 15. The lidar data acquisition unit 15 outputs the acquired three-dimensional data (distance measurement data) to the moving body recognition analysis unit 16.

In the moving body recognition analysis unit 16, the alarm activation analysis unit 16f senses the moving body on the basis of the alarm activation function designated for each area. Then, the alarm activation analysis unit 16f determines whether or not any area is in a situation where a warning should be issued. In a case where there is an area where a warning should be issued, the moving body recognition analysis unit 16 outputs a lighting instruction signal to the warning lamp so as to light the lamp according to the level of the warning. In response to this, the warning lamp lights the lamp Note that the warning lamp may include a plurality of lamps and may be designated for each area.

Further, the moving body recognition analysis unit 16 outputs a result of sensing of the moving body to the video processing unit 18 via the result output unit 17. In response to this, the video processing unit 18 creates the display screen 100 (see FIG. 4A) to be displayed on the display 42. At that time, the video processing unit 18 may perform arbitrary camera video processing such as, for example, superimposing a person sensing frame on the camera video.

Further, as illustrated in FIG. 18B, the safety monitoring device 10 may be configured to include an image recognition unit 18a for camera video processing in the video processing unit 18. On the basis of the video data (camera video) photographed by the monitoring camera 61, the image recognition unit 18a performs person determination by face identification, sex determination, posture determination, and the like with respect to the person recognized by the moving body recognition analysis unit 16. In this way, the safety monitoring device 10 can determine the danger level more finely.

<Regarding Smoothing of Bounding Box>

Figure 19:
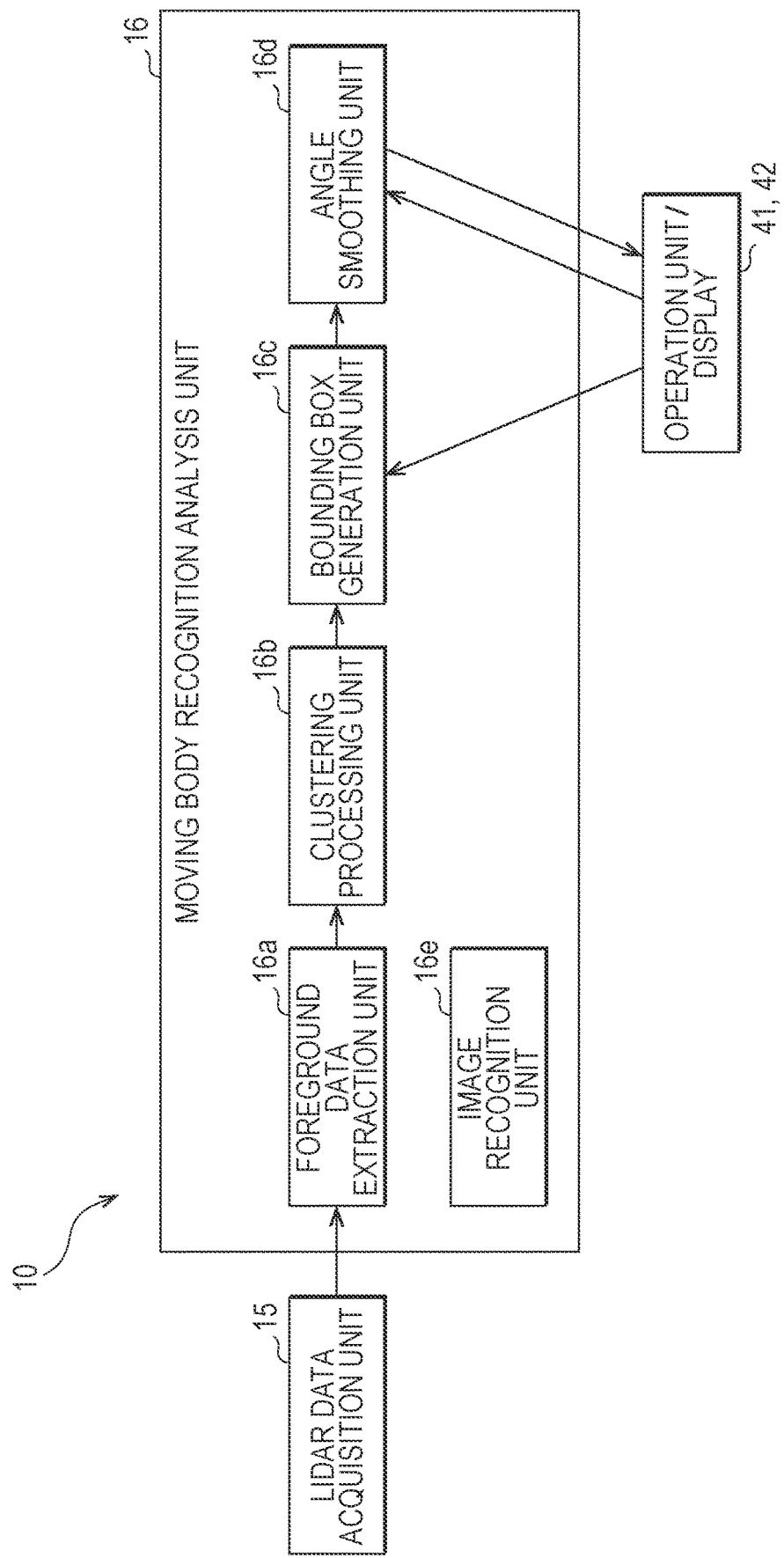
FIG. 19 is operation explanatory diagram (3) of a safety monitoring device according to an embodiment.

The safety monitoring device 10 preferably has a bounding box smoothing function. FIG. 19 is an operation explanatory diagram of the safety monitoring device 10.

As illustrated in FIG. 19, the safety monitoring device 10 outputs the three-dimensional data (distance measurement data) acquired from the lidar 51 with the lidar data acquisition unit 15 to the moving body recognition analysis unit 16. In the moving body recognition analysis unit 16, the foreground data extraction unit 16a extracts foreground data by taking a difference between three-dimensional data (distance measurement data) as input data and background data acquired in advance.

Next, the clustering processing unit 16b extracts point cloud data having a certain cluster from the foreground data and sets the point cloud data as a moving body candidate. Then, the clustering processing unit 16b verifies continuity with all the frames from among the point cloud data set as the moving body candidate, regards point cloud data having continuity as a moving body, and allocates an ID. Thereafter, the bounding box generation unit 16c generates a bounding box for the point cloud data regarded as a moving body.

The angle θ between the frames on the (x, z) plane of the bottom surface of the created bounding box is a discrete value for each Δθ. Thus, the angle smoothing unit 16d performs averaging processing with the number of frames or a processing method specified in advance. At that time, the safety monitoring person may make a change or the like in the number of frames and the processing method using the operation unit 41.

Further, the safety monitoring device 10 simultaneously displays the video data (camera video) and the bounding box obtained as the point cloud data on the display 42. Therefore, the safety monitoring device 10 can show the safety monitoring person the portion without point cloud data on the back side with respect to the lidar 51 to such an extent that the approximate outer shape is visually visible by the bounding box.

For example, a case where the input data from the lidar 51 is 10 fps (frames/second) will be described. FIG. 20 is an explanatory diagram illustrating an example of angle smoothing processing. FIG. 20 illustrates an example of a case where the angle θ of the bounding box of the same object is 4θ=6° for each frame, and the angle θ is obtained by a simple average formula of five frames.

The obtained angle θ is discretely any one angle of 0°, 6°, 12°, 18°, ..., 78°, and 84°. In the illustrated example, an example in which the angle θ gradually bends from 6° to 12° is illustrated. In the illustrated example, the angle θ is either 6° or 12° due to the variation of the point cloud. The movement of the bounding box in such a state visually appears to be lagging.

Here, in a case where the angle of an i-th frame is θ(i) and the average angle is θave(i), the simple average formula of five frames is Formula (1) described below.

$$\theta ave(i) = (\theta(i-4) + \theta(i-3) + \theta(i-2) + \theta(i-1) + \theta(i)) \div 5 \quad (1)$$

The average angle illustrated in FIG. 20 is an angle of a calculation result according to Formula (1) above. The average angle illustrated in FIG. 20 is an angle of smooth change Therefore, the movement of the bounding box has a stable appearance and is relatively close to the actual movement of the moving body (for example, a bus or the like). However, for example, since angle data between the past four frames and the current frame is used, the movement of the bounding box is a slightly delayed motion. The smoothness of the movement of the bounding box can be improved by increasing the number of smooth frames, but the responsiveness is lowered. Thus, it is preferable to select the number of smooth frames according to the situation of a moving body to be detected. For example, since a bus, a truck, or the like hardly turns suddenly, a larger number of frames may be selected, and a smaller number of frames may be selected for a car that often turns such as a forklift.

FIG. 21 is an explanatory diagram illustrating an example of angle smoothing processing similarly to FIG. 20. However, while FIG. 20 illustrates an example of a case of being obtained by the simple average formula of five frames, FIG. 21 illustrates an example of a case of being obtained by a weighted average formula of five frames weighted by Formula (2) described below. The weighted average formula is a formula that puts weight on a current frame.

Here, in a case where the angle of an i-th frame is θ(i) and the average angle is θave(i), the weighted average formula of five frames weighted by the weighted average formula is Formula (2) described below.

$$\theta ave(i) = (1 \times \theta(i-4) + 2 \times \theta(i-3) + 3 \times \theta(i-2) + 4 \times \theta(i-1) + 5 \times \theta(i)) \div 15 \quad (2)$$

FIG. 22 is an explanatory diagram illustrating a setting example of angle smoothing processing. FIG. 22 illustrates an example of a case where averaging processing is set by a graphical user interface (GUI), which is not illustrated, by operating the operation unit 41.

In the example illustrated in FIG. 22, the display screen is configured to be able to set the execution of the angle smoothing processing to "Yes" or "No" by using a radio button. Further, the display screen is configured to be able to set execution of the angle smoothing processing in a case where the aspect ratio (width/depth) of the moving body is less than a certain value. Further, the display screen is configured to be able to set that the angle smoothing processing is executed when the size (width), which is an execution target, is less than a certain size. Note that as the value of the size (width), which is an execution target, is set to be larger, the angle smoothing unit 16d frequently executes the angle smoothing processing with respect to the moving body. Further, the display screen is configured to be able to set execution of the angle smoothing processing in a case where the number of averaged frames is less than a certain number. In the illustrated example, five frames is selected as the number of averaged frames, but this value can be freely changed. Further, the display screen is configured such that either the simple average or the weighted average can be selected by using a radio button.

Note that when the center coordinates of the bottom surface of the bounding box in the i-th frame are (Cx(i), Cz(i)), the angle smoothing processing of Cxave(i) and Czave(i) is performed by Formulae (3) and (4) below.

$$Cxave(i)=(Cx(i-4)+Cx(i-3)+Cx(i-2)+Cx(i-1)+Cx(i))\div 5 \quad (3)$$

$$Czave(i)=(Cz(i-4)+Cz(i-3)+Cz(i-2)+Cz(i-1)+Cz(i))\div 5 \quad (4)$$

Note that, in the above calculation example, the angle smoothing unit 16d performs the angle smoothing processing using the simple average, but may perform the angle smoothing processing using the weighted average. Further, the safety monitoring device 10 may perform smoothing processing of the center coordinates simultaneously with angle smoothing processing using a graphical user interface, which is not illustrated. Further, the safety monitoring device 10 may be provided with a graphical user interface, which is not illustrated, independently of angle.

<Regarding Exclusion of Video Data in which Important Mark is Set at Time of Automatic Video-Record Erasure>

Figure 23:
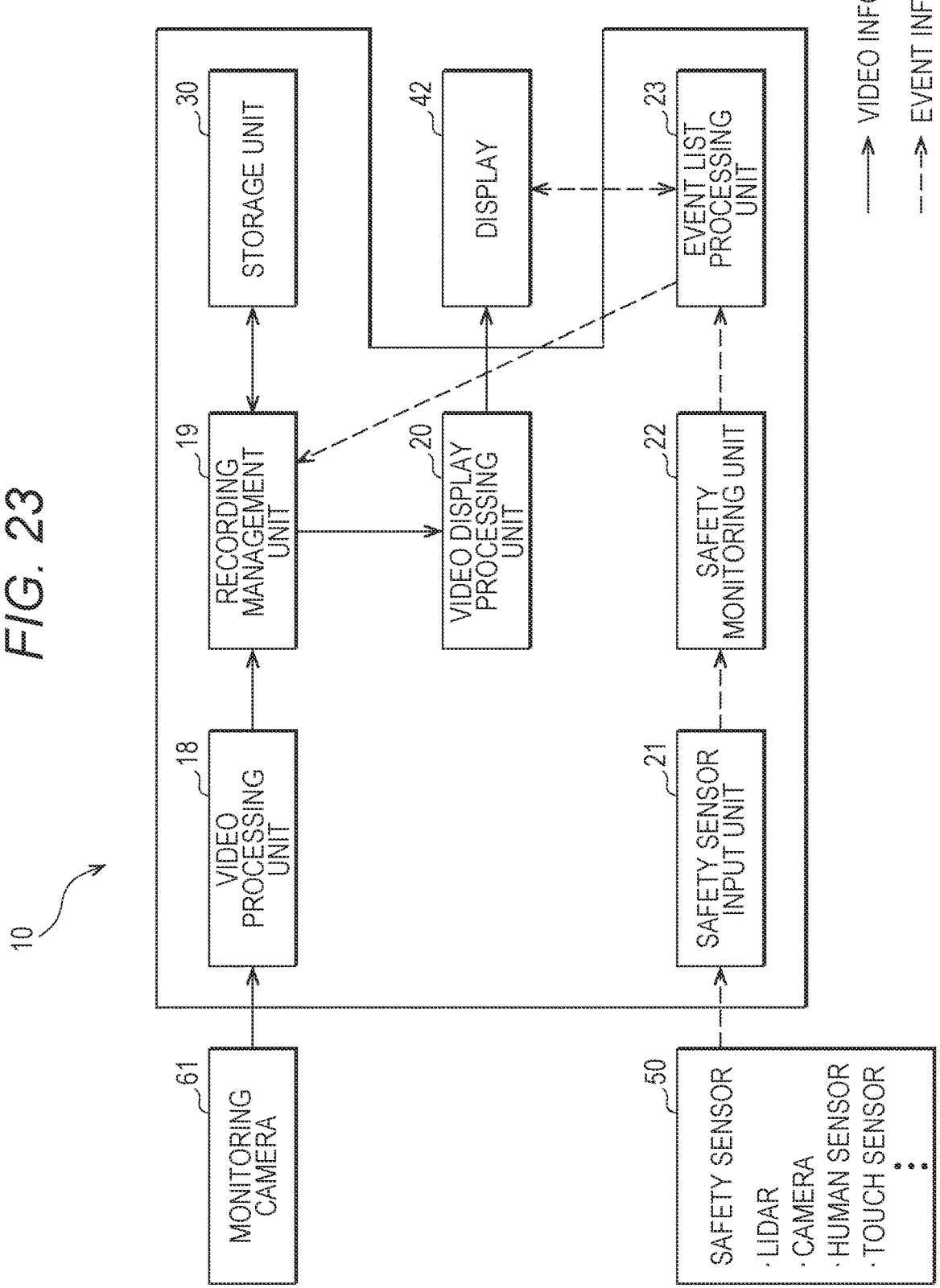
FIG. 23 is an operation explanatory diagram of a safety monitoring device according to an embodiment.

It is sufficient if the safety monitoring device 10 is configured to constantly video-record (store in the storage unit 30) the video data (camera video) acquired from the monitoring camera 61 and erase the video data after a lapse of a certain period. FIG. 23 is an operation explanatory diagram of such a safety monitoring device 10.

As illustrated in FIG. 23, the safety monitoring device 10 converts the video data (camera video) acquired from the monitoring camera 61 into manageable data such as MxPEG by the video processing unit 18 and outputs the data to the recording management unit 19.

The recording management unit 19 records the converted data in a storage means (the storage unit 30 or an external recording medium, which is not illustrated) by dividing the converted data into files (file data) at predetermined time intervals so that the database management is enabled. Further, the recording management unit 19 acquires a file from the video processing unit 18 on the basis of an instruction from the safety monitoring person, and outputs the acquired file to the video display processing unit 20. Further, the recording management unit 19 reads a file of a designated time from a file group recorded in the storage means (the storage unit 30 or the external recording medium, which is not illustrated), and outputs the file to the video display processing unit 20. The video display processing unit 20 creates an image on the basis of the file and displays the image on the display 42.

Further, the safety monitoring device 10 acquires a sensing signal of an object in the measurement space from a safety sensor 50 such as a lidar, a camera, a human sensor, or a touch sensor with the safety sensor input unit 21, and outputs the sensing signal to the safety monitoring unit 22. The safety monitoring unit 22 senses entry of a person, entry of a dangerous object, or the like on the basis of the sensing signal, and issues an event. That is, the safety monitoring unit 22 monitors entry of an object into a monitoring region of the safety sensor 50. Then, the safety monitoring unit 22 outputs the event to the event list processing unit 23. At this time, the safety monitoring unit 22 sets the time when the object enters the monitoring region of the safety sensor 50 as the start time of the event, and sets the time when the object leaves the monitoring region or the time when a certain time has elapsed from the start time of the event as the end time of the event. Then, the safety monitoring unit 22 notifies the event list processing unit 23 of the start time and the end time of the event.

Figure 24:
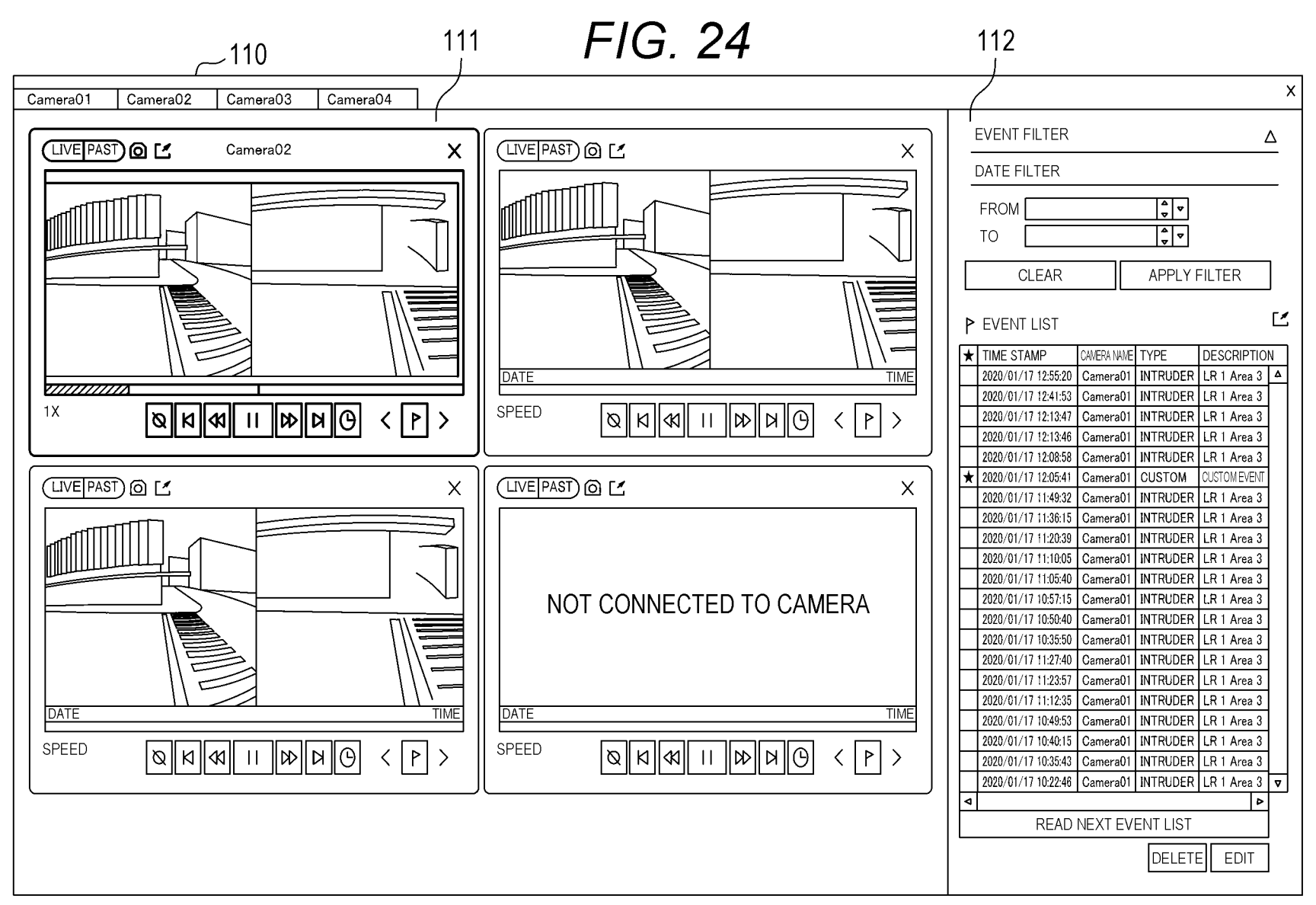

In response to this, the event list processing unit 23 creates and updates the event list, and displays a display screen 110 illustrated, for example, in FIG. 24, on the display 42. FIG. 24 is an explanatory diagram illustrating an example of the display screen 110. In the example illustrated in FIG. 24, the display screen 110 has a configuration in which the video of each measurement space photographed by the monitoring camera 61 and the updated event list are arranged at the same time. The safety monitoring person operates the operation unit 41 while viewing the display screen 110. The event list processing unit 23 edits the event in accordance with the operation of the safety monitoring person.

Note that, in the example illustrated in FIG. 24, the display screen 110 has a configuration in which a video display unit 111 that displays a video is arranged on the left side, and an event list display unit 112 that displays an event list is arranged on the right side.

In the example illustrated in FIG. 24, the video display unit 111 is divided into four screens. The safety monitoring device 10 is configured to be able to connect up to four monitoring cameras 61, and displays the video acquired from each monitoring camera 61 on an arbitrary screen of the video display unit 111. Note that the safety monitoring device 10 may selectively use the four screens of the video display unit 111 according to the operation. For example, the safety monitoring device 10 may display a live video from the monitoring camera 61 on the upper left screen of the video display unit 111, and display a video-record reproduction video from the storage means on the upper right screen of the video display unit 111.

Further, the safety monitoring device 10 is configured to be able to reproduce the video relating to each event of the event list displayed on the event list display unit 112 on the video display unit 111. For example, the safety monitoring person selects an event to be reproduced from the event list displayed on the event list display unit 112, and double-clicks the event with a mouse or drags the event to a reproduction screen on the video display unit 111. In this way, the safety monitoring device 10 reproduces the video related to the selected event on the video display unit 111.

FIG. 25 is an explanatory diagram illustrating an example of an event list. In the example illustrated in FIG. 25, an event list 120 is configured to include, from the left, an important mark field 121, a time stamp field 122, a camera name field 123, a type field 124, and a description field 125.

The important mark field 121 is a field to which an important mark indicating an important event is added. In the illustrated example, the important mark has a star shape, but the shape of the important mark is not limited to the star shape and may be any shape.

The time stamp field 122 is a field for displaying the start time of an event.

The camera name field 123 is a field for displaying the name of the camera that has photographed a video.

The type field 124 is a field for displaying an event type (Intruder, CUSTOM, or the like).

The description field 125 is a field for displaying description regarding an event.

Note that the event list 120 can be configured to display the end time, an occurrence cause, and the like of an event in addition to the above.

The event list 120 is configured such that the important mark can be turned on/off by clicking the important mark field 121 of an arbitrary event with a mouse. The safety monitoring person reproduces the video of an arbitrary event, performs video confirmation, and adds an important mark to the important mark field 121 of the event when determining that an incident (important occurrence) has occurred in the video being reproduced. The safety monitoring device 10 stores the video related to the event to which the important mark is added so that the video is not erased.

The safety monitoring device 10 can perform editing processing on an event by the safety monitoring person arbitrarily selecting one event from the event list 120 and performing an editing operation on an event editing screen 130 illustrated in FIG. 26. FIG. 26 is an explanatory diagram illustrating an example of the event editing screen 130.

In the example illustrated in FIG. 26, the event editing screen 130 is configured to include a camera name field 131, a user name field 132, an occurrence date and time field 133, an end date and time field 134, a description field 135, a type field 136, a mark field 137, a cause field 138, a measure field 139, and an importance field 140.

The camera name field 131 is a field for displaying the name of the camera that has photographed a video.

The user name field 132 is a field for displaying a user name.

The occurrence date and time field 133 is a field for displaying the occurrence date and time of an event.

The end date and time field 134 is a field for displaying the end date and time of an event.

The description field 135 is a field for inputting description regarding an event.

The type field 136 is a field for inputting an event type (Intruder, CUSTOM, or the like).

The mark field 137 is a field for displaying the type of an important mark.

The cause field 138 is a field for inputting the cause of an incident that has occurred.

The measure field 139 is a field for inputting a measure for an incident that has occurred.

The importance field 140 is a field for inputting the importance of an incident that has occurred.

The event editing screen 130 illustrated in FIG. 26 has contents reflecting detailed data of an event to which the important mark illustrated in FIG. 25 is added. In the example illustrated in FIG. 26, the occurrence date and time (start time) of an event displayed in the occurrence date and time field 133 is 2020/01/17 12:05:41. Further, the end date and time (end time) of an event displayed in the end date and time field 134 is 2020/1/17 12:11:20. In the case of reproducing the video data of the event, it is sufficient if the safety monitoring person takes a certain time (for example, 10 seconds before and after) longer than the occurrence date and time (start time) and the end date and time (end time) of the event and reproduce the video data. For example, it is sufficient if the safety monitoring person edits the occurrence date and time field 133 and the end date and time field 134 on the event editing screen 130, sets the occurrence date and time of the event to 2020/1/17 12:05:31, sets the end date and time of the event to 2020/1/17 12:11:30 and reproduce the video. Note that a certain time (for example, 10 seconds before and after) applied to change the date and time can be arbitrarily changed.

The safety monitoring person can edit the occurrence date and time (the start time of the event) in the occurrence date and time field 133 and the end date and time (the end time of the event) in the end date and time field 134 from the event editing screen 130.

Further, although not illustrated, the safety monitoring device 10 can limit the end time of the event to the time up to "the start time of the event+the longest time of the event" by setting the longest time of the event.

Further, the safety monitoring device 10 can be configured to operate as described below. For example, a monitoring area is set in advance in the lidar 51, a time when a person enters the monitoring area is set as the occurrence date and time (start time) of the event, and a time when the person leaves the monitoring area is set as the end date and time (end time) of the event. Then, the safety monitoring device 10 can acquire the occurrence date and time data and the end date and time data of the event from the lidar 51 at the time of event registration, and record and manage the acquired date and time data in the storage unit 30.

Further, the safety monitoring device 10 can limit the end time of the event to the time up to "the start time of the event+the longest time of the event" in a case where the moving body stays in the monitoring area for a long time.

Further, the safety monitoring device 10 may be configured to be able to edit other items from the event editing screen 130.

Further, the safety monitoring device 10 may be configured to be able to create a new event by reproducing a video at an arbitrary time by using the event editing screen 130.

Figure 27:
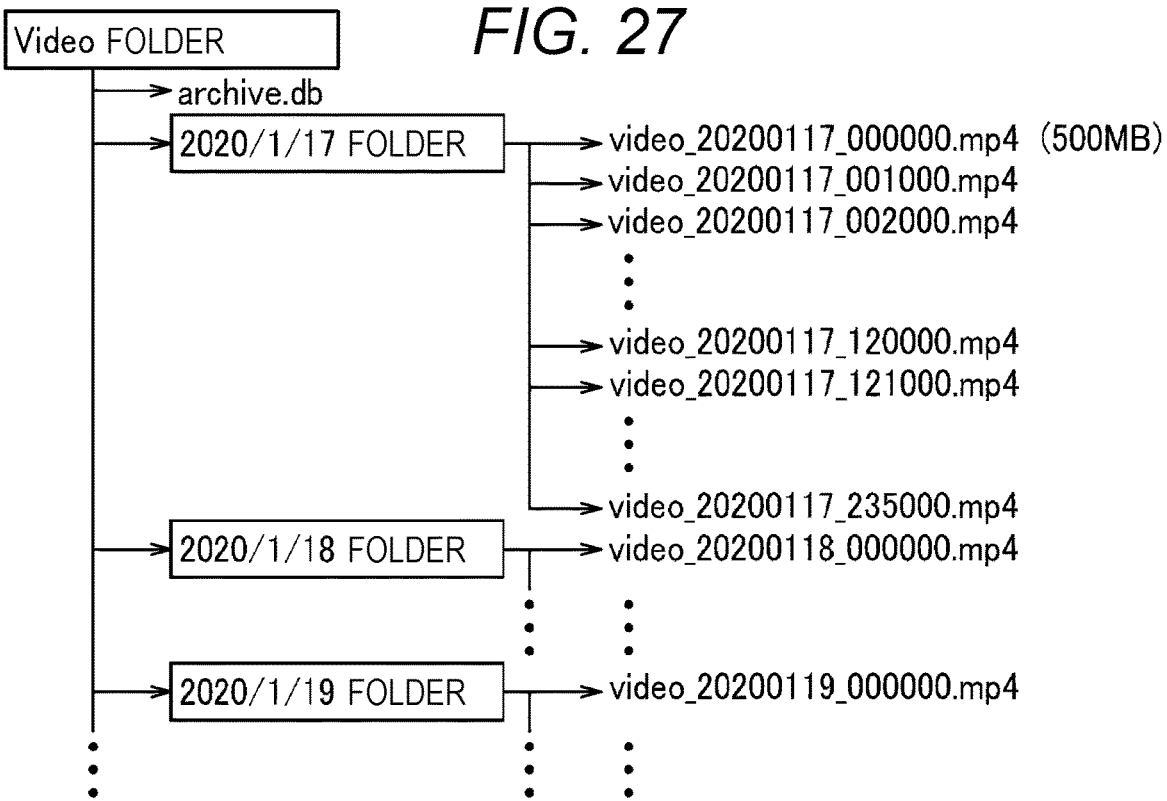
FIG. 27 is an explanatory diagram illustrating an example of a save format of video data in a recording means.

FIG. 27 is an explanatory diagram illustrating an example of a save format of video data in a storage means. FIG. 27 illustrates an example in which SQLite, which is one of open source relational database management systems (RDBMS), is used for file management.

As illustrated in FIG. 27, in the storage unit 30, a database management file called "archive.db" is created under "Video folder", and a date folder indicating a date (for example, "2020 Jan. 17 folder", "2020 Jan. 18 folder", "2020 Jan. 19 folder"), or the like is created once a day.

For example, a video data file compressed in H.264 format is created under each date folder. In the example illustrated in FIG. 27, for example, "video_20200117_000000.mp4", "video_20200117_001000.mp4", and the like are created as the video data file. "video_20200117_000000.mp4" is a video data file for 10 minutes from 2020/1/17 0:00:00. Further, "video_20200117_001000.mp4" is a video data file for 10 minutes from 2020/1/17 0:10:00. In the present embodiment, description is given assuming that a video data file is created at intervals of 10 minutes as described above. As a result, 144 files of "24 hours×(6 files/1 hour)" are created per day.

In the case of a normal XGA format (1024×768 pixels), the data amount of video-recorded data for 10 minutes is about 500 MB, and the data amount of video-recorded data for one month is about 2 TB. Therefore, when a large capacity hard disk drive (HDD) is used as a recording means (the storage unit 30 or the external recording medium, which is not illustrated), the safety monitoring device 10 can constantly save the video-recorded data for about 30 days.

In the present embodiment, the safety monitoring device 10 constantly saves video-recorded data (video data file) for 30 days, and automatically erases the video-recorded data (video data file) for one day, which exceeds 30 days from video-recording, once a day. At this time, the safety monitoring device 10 automatically deletes the event, which exceeds 30 days from issuance, from the event list.

However, the safety monitoring device 10 saves the video-recorded data (video data file) related to the event to which the important mark illustrated in FIGS. 25 and 26 is added without erasing the video-recorded data.

For example, if the important mark is not added to the video-recorded data in which the time stamp illustrated in FIG. 25 is 2020/01/17 12:05:41, the video-recorded data is automatically erased when the save period of 30 days is exceeded. However, an important mark is added to the video-recorded data in which the time stamp illustrated in FIG. 25 is 2020/01/17 12:05:41. Therefore, even at the timing of the automatic erasure (that is, for example, even if the save period from video-recording exceeds 30 days), the video-recorded data is continuously saved without being erased. Further, the event corresponding to the video-recorded data to which such an important mark is added is left without being deleted from the event list.

The safety monitoring device 10 checks the event to which the important mark is added at the time of automatic erasure of the video-recorded data once a day, obtains the reproduction time of the event to which the important mark is added, and saves the video-recorded data (video data file) including the time without erasing. For example, here, it is assumed that the safety monitoring device 10 saves the video-recorded data (video data file) including 2020 Jan. 17 12:05:31 to 12:11:30 without erasing the video-recorded data with respect to the video-recorded data in which the time stamp illustrated in FIG. 25 is 2020 Jan. 17 12:05:41.

Figure 28:
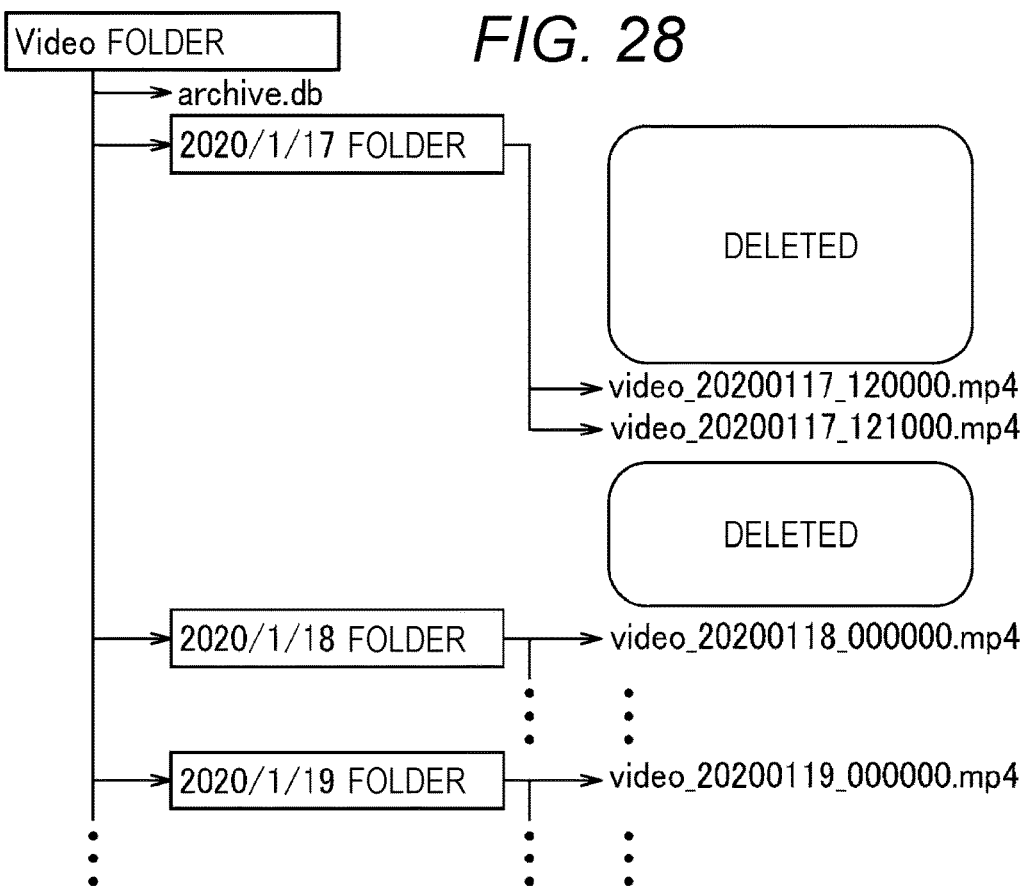
FIG. 28 is an explanatory diagram illustrating an example of processing of leaving video data of an event marked with an important mark of a star sign at the time of automatic erasure.

In the example illustrated in FIG. 27, the video-recorded data including 2020/1/17 12:05:31 to 12:11:30 includes two files: "Video_20200117_120000.mp4" and "Video_20200117_121000.mp4". As illustrated in FIG. 28, even at the time of automatic erasure of video-recorded data, the safety monitoring device 10 leaves two files related to the event to which the important mark is added, and automatically erases the other files.

Note that the video data file that has not been erased even at the time of automatic erasure of video-recorded data is erased at the time of automatic erasure of video-recorded data performed subsequently when the important mark is turned off (deleted) from the event by the subsequent editing. Further, in this case, the event for which the important mark is turned off (deleted) is also deleted from the event list.

<Main Features of Safety Monitoring Device>

(1) As illustrated in FIG. 2, the safety monitoring device 10 according to the present embodiment is configured to include the area setting unit 12 capable of setting a plurality of alarm activation target areas with respect to the sensing target area of the safety sensor, the alarm activation type setting unit 13 capable of setting the type of an arbitrary alarm activation function with respect to each of the alarm activation target areas, and the moving body recognition analysis unit 16 that recognizes the motion of the moving body on the basis of sensor data measured by the safety sensor.

At a construction site, a manufacturing site, and the like, various management areas are assumed, such as an area where a heavy machine (for example, a crane) works, an area where a work vehicle such as a forklift moves around, and an area where all moving bodies should not enter for vibration suppression, security, and the like. The safety monitoring device 10 according to the present embodiment can set such various management areas as an alarm activation target area, and can set a plurality of alarm activation target areas with respect to the sensing target area of the safety sensor. Further, the safety monitoring device 10 can set the type of an arbitrary alarm activation function for each of the alarm activation target areas. That is, the safety monitoring device 10 can independently set different alarm activation functions for each of the plurality of alarm activation target areas. Therefore, the safety monitoring device 10 can realize an optimum monitoring method. Further, the safety monitoring device 10 can satisfactorily grasp a relationship between a person and an object.

(2) As illustrated in FIG. 4A, the safety monitoring device 10 according to the present embodiment includes the sensor data acquisition unit (lidar data acquisition unit 15) that acquires three-dimensional data (distance measurement data) as sensor data from the lidar 51, which is a safety sensor. The moving body recognition analysis unit 16 may be configured to extract a moving body from the sensing target area on the basis of the three-dimensional data and sense traveling of the moving body to each of the alarm activation target areas.

Such a safety monitoring device 10 according to the present embodiment can set a plurality of areas with measurement accuracy under the same condition by using the safety sensor (for example, the lidar 51) capable of measurement of three-dimensional data. Therefore, the safety monitoring device 10 can ensure stable sensing accuracy. Further, in a case where a condition for monitoring is changed, the safety monitoring device 10 can cope with only by changing the setting of the area without a physical change such as reattachment of the sensor.

(3) Preferably, the alarm activation type setting unit 13 of the safety monitoring device 10 according to the present embodiment may be configured to be able to select any two or more of: a function of issuing a warning to all moving bodies; a function of issuing a warning only to a person; a function of issuing a warning in a case where a distance between a person and a large object larger than the person is within a certain distance; a function of issuing a warning in a case where a person enters the traveling direction of a large object; an alarm activation function of issuing a warning only to a moving body at a certain speed or higher; an alarm activation function of issuing a warning only to a moving body at a certain speed or lower; a function of combining two or more arbitrary functions to obtain a logical sum; and a function of combining two or more arbitrary functions to obtain a logical product, as the type of the alarm activation function.

Such a safety monitoring device 10 according to the present embodiment can use various types of alarm activation functions according to the operation. For example, in an area where a heavy machine (for example, a crane) moves, it is preferable to issue a warning when a person approaches the heavy machine. Further, in an area where a work vehicle such as a forklift moves, it is preferable to perform monitoring so that a worker does not enter. Furthermore, in an area where a heavy machine or the like running on a rail moves, it is preferable to issue a warning when a person enters the traveling direction. Further, in an area where all moving bodies should not enter for vibration suppression, security, or the like, it is preferable to monitor the movement of all moving bodies. Further, depending on the area, there is an area in which it is preferable to perform monitoring so as to issue a warning when the moving body enters beyond the speed limit. The safety monitoring device 10 can realize appropriate warning issuance in such an area. Further, depending on the area, by setting a condition for issuing a warning to a logical product condition of a certain speed or more of a person and a large object (for example, a car), the safety monitoring device 10 can be set to issue a warning when the large object (for example, a car) enters the area beyond the speed limit. Further, by setting a condition for issuing a warning to a logical sum condition of speeds of a person and a large object, the safety monitoring device 10 can also be set to issue a warning when the large object enters the area.

(4) As illustrated in FIGS. 5 and 6, the safety monitoring device 10 according to the present embodiment may be configured such that the type of the alarm activation function can be designated for each area via a user interface.

In a construction site, a manufacturing site, and the like, the environment changes from moment to moment according to the progress of work. Therefore, it is preferable that the setting of the area and the selection of the alarm activation function can be arbitrarily and easily changed according to the situation of the site. The safety monitoring device 10 according to the present embodiment can realize an environment in which the setting can be arbitrarily and easily changed via a user interface.

(5) As illustrated in FIGS. 12 to 14, the moving body recognition analysis unit 16 of the safety monitoring device 10 according to the present embodiment may be configured to extract point cloud data representing a moving body from three-dimensional data measured with the lidar 51, which is a safety sensor, create a bounding box having a size necessary for surrounding the point cloud data, determine a minimum value and a maximum value of each of five pieces of data, that is, the width, the depth, and the height of the bounding box, and the height of the bottom surface and the height of the top surface of the bounding box, as the size of a person by using any one or more or all of the five pieces of data, determine that the size of the moving body is within the determined range as the determination condition of person, and identify the moving body as a person when the size of the moving body continuously conforms to the determination condition for an arbitrarily determined certain time.

Such a safety monitoring device 10 according to the present embodiment can sense a person by a simple method without using a known image processing method or a machine learning-based method by sensing from the size of the bounding box.

Note that the point cloud data of the moving body measured by the lidar 51 is subjected to clustering processing and processed as one mass (object). At that time, since a large object (for example, a car or the like) often has an uneven shape, there is a possibility that the large object is not stably recognized as one object but is recognized as being divided into a plurality of masses. In this case, the size of one divided mass may be the same as the size of a person. Accordingly, when the attribute of the moving body is simply determined only by the size of the person, there is a possibility that a large object is erroneously determined as a person. On the other hand, since the state in which the large object is divided into a plurality of masses and recognized is often resolved in a short period, the safety monitoring device 10 according to the present embodiment can determine that the moving body (mass) is a person when the state in which the size of the moving body (mass) is determined to be the size of the person continues for a certain time. Even when a large object is erroneously determined as a person on the basis of the size of the moving body (mass), such a safety monitoring device 10 can greatly reduce erroneous determination of the large object as a person by determining whether or not the moving body (mass) is a person on the basis of both the size of the moving body (mass) and the duration of the size.

Further, in a construction site, a manufacturing site, or the like, a worker walks on the ground. In such an environment, a phenomenon in which a large object is divided into a plurality of masses and recognized, and the size of one divided mass becomes the size of a person often occurs at a place higher than the ground. Therefore, the safety monitoring device 10 according to the present embodiment adds, as a condition, that the height of the bottom surface of the bounding box is equal to or less than a certain height. Further, since the height of a person is about 2 m at the highest, the safety monitoring device 10 according to the present embodiment can prevent a moving body other than a person from being erroneously recognized as a person by determining that the moving body is not a person when the height of the top surface of the bounding box is higher than an arbitrarily determined certain height.

Note that, since the safety monitoring device 10 according to the present embodiment senses a person according to the size of the bounding box, it is possible to include a moving body other than a person by adjusting the size. For example, the safety monitoring device 10 can also adjust the size of the bounding box so as to include a person carrying a load, a plurality of persons in a lump, a small car, an object carried by a crane, and the like.

(6) As illustrated in FIG. 12, the moving body recognition analysis unit 16 of the safety monitoring device 10 according to the present embodiment identifies a large object larger than a person by using any one or more or all of the five pieces of data including the width W, the depth D, and the height H of the bounding box, and the height Hb of the bottom surface and the height Ht of the top surface of the bounding box. Then, as illustrated in FIG. 15, the moving body recognition analysis unit 16 may be configured to calculate, as the distance between the person and the large object, a distance (Dmin−AD_R) obtained by subtracting the radius of the circumscribed circle of the bottom surface or the top surface of the bounding box of the person from the minimum value of the distance between the center point 106o of the bottom surface or the top surface of the bounding box 106box of the person and each side of the bottom surface or the top surface of the bounding box 105box of the large object, and issue a warning when the distance between the person and the large object becomes smaller than an arbitrarily determined certain distance.

In obtaining the distance between a person and a large object, in a three-dimensional distance, there is a case where a dangerous object hangs over the head of the person, such as a crane vehicle. In such a case, even when the distance between the person and the crane vehicle is larger than a predetermined distance, there is a possibility that it is not safe. It is desirable that the safety monitoring device 10 according to the present embodiment does not overlook such a case. Thus, it is sufficient if the moving body recognition analysis unit 16 of the safety monitoring device 10 according to the present embodiment calculates the distance using the bottom surface (or the top surface) of each bounding box. As illustrated in FIG. 15, the moving body recognition analysis unit 16 obtains a distance from the center to each line segment of the bottom surface of the bounding box 105box of the large object with reference to the center point 106o of the bottom surface of the bounding box 106box of the person, and calculates a distance (Dmin-AD_R) obtained by subtracting the radius of the circumscribed circle of the bottom surface of the bounding box 106box of the person from the minimum value as the distance between the person and the large object. In this way, the safety monitoring device 10 can calculate distances of all combinations between a plurality of persons and a large object present in the alarm activation target area (entry prohibited area), and issue a warning when the distances of the combinations become smaller than a certain distance. Such a safety monitoring device 10 can perform monitoring without omission so as not to overlook a risk even when the risk is easily overlooked in a case where a dangerous object hangs over the head of a person such as, for example, a crane vehicle as described above.

(7) As illustrated in FIGS. 15 to 18B, the moving body recognition analysis unit 16 of the safety monitoring device 10 according to the present embodiment may be configured to issue a warning when a time during which a distance between a person and a large object becomes smaller than a certain distance continues for an arbitrarily determined certain time.

In a construction site, a manufacturing site, or the like, when a person approaches a large object and stays near a certain distance from the large object, there is a possibility that a large number of warnings is issued continuously. Thus, the safety monitoring device 10 according to the present embodiment can prevent a large number of warnings from being issued continuously by generating a warning in the case of continuation for a certain time.

(8) The moving body recognition analysis unit 16 of the safety monitoring device 10 according to the present embodiment may be configured to stop the warning when the distance between the person and the large object becomes larger than a certain distance.

When a person approaches a large object and then moves away from the large object and the distance between the person and the large object becomes larger than a certain distance, the person is in a state of retreating to a safety zone. Thus, it is sufficient if the safety monitoring device 10 according to the present embodiment stops the warning when the distance between the person and the large object becomes larger than a certain distance.

(9) The moving body recognition analysis unit 16 of the safety monitoring device 10 according to the present embodiment may be configured to stop a warning when a time during which a distance between a person and a large object becomes larger than a certain distance continues for arbitrarily determined certain or more time.

In a case where a person approaches a large object and then moves away from the large object and the person stays near a certain distance, there is a possibility that a large number of warnings is continuously issued before the person retreats to a safety zone. Thus, it is sufficient if the safety monitoring device 10 according to the present embodiment stops the warning when the time during which the distance between the person and the large object becomes larger than a certain distance continues for arbitrarily determined certain or more time.

(10) The moving body recognition analysis unit 16 of the safety monitoring device 10 according to the present embodiment may be configured to change the alarm level according to the distance between the person and the large object.

For example, when a person approaches an object, such a safety monitoring device 10 according to the present embodiment can change a warning level such as a caution level, a warning level, or a danger level according to the approach distance. At that time, for example, the safety monitoring device 10 may change an alarm lamp from yellow to red when the level of warning changes from the caution level to the warning level, and further may sound an alarm sound (buzzer sound) through the speaker 44 when the level of warning changes from the warning level to the danger level.

(11) The moving body recognition analysis unit 16 of the safety monitoring device 10 according to the present embodiment may be configured to calculate the speed of the moving body from the distance over which the center position of the bounding box has moved for a certain time.

Such a safety monitoring device 10 according to the present embodiment can grasp the timing at which the moving body enters the area by specifying the speed of the moving body from the distance over which the center position of the bounding box has moved for a certain time (for example, 0.5 seconds).

(12) The safety monitoring device 10 according to the present embodiment may be configured to include the video processing unit 18 that superimposes the position of the moving body sensed by the safety sensor (for example, the lidar 51) on the video data.

For example, in a case where the moving body is a person for which a warning is issued, such a safety monitoring device 10 according to the present embodiment superimposes a warning mark as the position of the moving body on the corresponding person, thereby allowing the safety monitoring person to visually recognize the danger quickly. In this way, the safety monitoring person can quickly take some measures.

(13) As illustrated in FIG. 2, the safety monitoring device 10 according to the present embodiment includes the recording management unit 19 that records and manages video data obtained by photographing the whole or a part of the sensing target area in the storage unit 30, and the event list processing unit 23 that adds an event including alarm activation data to an event list and manages the event when a warning is issued. The recording management unit 19 constantly records the video data in the storage unit 30. Then, when an arbitrary alarm activation portion is designated from the event list, the safety monitoring device 10 may be configured such that the event list processing unit 23 displays video data of a certain time before and after of the designated alarm activation portion on the display 42 (display unit).

Such a safety monitoring device 10 according to the present embodiment records and saves the time point of alarm activation and creates an event list so that the reproduction portion can be designated so as to allow the safety monitoring person to grasp the behavior of the person to which a warning has been issued. Then, when an arbitrary event is designated, the safety monitoring device 10 can reproduce the video data of the time before and after corresponding to the designated event. In this way, the safety monitoring person can verify the danger degree by confirming the video data of the time before and after corresponding to the designated event. Further, in this way, the safety monitoring person can also provide the workers at the site with risk prediction education.

(14) The event list processing unit 23 of the safety monitoring device 10 according to the present embodiment may be configured to be able to filter and display alarm activation data (events including alarm activation data) for each type with respect to the event list displayed on the display 42 (display unit).

Such a safety monitoring device 10 according to the present embodiment can filter and display alarm activation data (events including alarm activation data) for each type. Therefore, for example, when only the function of issuing a warning only to a person is extracted as the filtering, the safety monitoring device 10 can easily extract video-recorded data suitable for the condition. Further, the safety monitoring device 10 can facilitate confirmation work of the video data by the safety monitoring person by managing and saving the alarm activation data (events including alarm activation data) for each alarm activation type. Further, the safety monitoring device 10 can, for example, limit video-recording of camera video to only when an alarm is issued. Furthermore, the safety monitoring device 10 can reduce the save capacity by selectively leaving a certain time before and after in the record according to the type of the alarm activation function. Further, the safety monitoring device 10 can facilitate confirmation work of the video data by the safety monitoring person by managing and saving the video data for each alarm activation type.

(15) As illustrated in FIG. 2, the safety monitoring device 10 according to the present embodiment includes the recording management unit 19 that records and manages the video data of the sensing target area in the storage unit 30. As illustrated in FIGS. 24 and 25, the recording management unit 19 may be configured to record the video data before and after a base point in the storage unit 30, the base point being a time point at which an occurrence for which a warning is issued occurs according to the type of the alarm activation function.

Such a safety monitoring device 10 according to the present embodiment records the video data before and after the base point in the storage unit 30, the base point being a time point at which an occurrence for which a warning is issued occurs. Therefore, the safety monitoring device 10 can manage the video data for each event that has occurred. Further, the safety monitoring device 10 can facilitate confirmation work of the video data by the safety monitoring person by managing and saving the video data for each event that has occurred.

(16) The alarm activation type setting unit 13 of the safety monitoring device 10 according to the present embodiment may be configured to be able to designate processing of sensing a feature of a moving body from video data of the sensing target area as an alarm activation function.

For example, fine features of a moving body cannot be acquired only by sensing the moving body using the lidar 51. Thus, the safety monitoring device 10 according to the present embodiment may be configured to be able to designate processing of sensing a feature of a moving body from video data. In this way, the safety monitoring device 10 can acquire fine features of the moving body such as human face recognition, sex, and the like from the video acquired from the camera as the alarm activation function. Since such a safety monitoring device 10 can set the condition for determining the attribute of the moving body in detail, it is possible to improve the accuracy of sensing the attribute of the object.

(17) The safety monitoring device 10 according to the present embodiment may be configured such that the processing of sensing a moving body includes any one of person identification by face recognition, sex determination, and posture determination.

Since such a safety monitoring device 10 according to the present embodiment can set the condition for determining the attribute of the moving body in detail, it is possible to improve the accuracy of sensing the attribute of the object.

(18) The safety monitoring device 10 according to the present embodiment may be configured to notify an external device (Web terminal 62, monitoring camera 61*z*, or the like) equipped with a program for performing camera video processing of warning data sensed by a set alarm activation function.

The external device (Web terminal 62, monitoring camera 61*z*, or the like) may manage the event and the video data independently of the operation of the safety monitoring device 10. Further, there is a case where it is easier to manage the event and the video data when the program executed by the safety monitoring device 10 and the program for displaying the camera video are configured separately. Thus, the safety monitoring device 10 according to the present embodiment may be configured to notify an external device equipped with a program for performing camera video processing of warning data sensed by a set alarm activation function. In this way, the safety monitoring device 10 can cause, for example, an external device to perform camera video processing and cause the external device to create an image in which an image of warning data overlaps the camera video. At that time, it is sufficient if the safety monitoring device 10 converts the position data (three-dimensional data) of the moving body sensed by the safety monitoring device 10 into two-dimensional data of camera video and causes an external device to create an image such that the position of the camera video corresponds to the position of the image of the warning data.

(19) As illustrated in FIGS. 19 to 22, the safety monitoring device 10 according to the present embodiment may be configured to include a smoothing means (angle smoothing unit 16*d*) that smooths the angle of the bounding box.

When the bounding box is generated for each frame (for example, every 0.1 seconds), the obtained angle θ varies due to the variation in the distance measurement data, and as a result, there is a possibility that the variation increases when the distance between two objects (for example, between a person and a car) is obtained. Thus, the safety monitoring device 10 according to the present embodiment can stabilize a change in the angle θ resulting from the movement of the car by smoothing the angle of the bounding box with the smoothing means (angle smoothing unit 16*d*). Therefore, the safety monitoring device 10 can stably obtain a distance between two objects (for example, between a person and a car). Further, the safety monitoring device 10 can display a visually natural motion video when displaying a video showing a moving body on the display 42 (display unit).

(20) The safety monitoring device 10 according to the present embodiment includes the video processing unit 18 that performs processing corresponding to the type of the alarm activation function on the three-dimensional data. As illustrated in FIGS. 19 to 22, the video processing unit 18 of the safety monitoring device 10 according to the present embodiment may be configured to simultaneously display the point cloud data and the bounding box on the display 42 (display unit).

Such a safety monitoring device 10 according to the present embodiment can cause the safety monitoring person to visually recognize what point cloud the actual measurement data is by simultaneously displaying the point cloud data after the clustering processing and the bounding box. Further, in a case where any accident occurs, the safety monitoring device 10 allows the safety monitoring person to easily grasp the situation of an accident site by allowing the safety monitoring person to visually recognize the point cloud data of the accident site and the bounding box simultaneously.

(21) As illustrated in FIGS. 19 to 22, it is sufficient if the smoothing means (angle smoothing unit 16d) of the safety monitoring device 10 according to the present embodiment is configured to smooth and calculate the angle of the bottom surface of the bounding box.

Since the angle is discrete, the calculation amount increases and the calculation time increases when the resolution is improved when generating the bounding box. Thus, it is sufficient if the smoothing means (angle smoothing unit 16d) of the safety monitoring device 10 according to the present embodiment is configured to smooth and calculate the angle of the bottom surface of the bounding box. The safety monitoring device 10 can obtain the angle with an appropriate calculation amount by smoothing the discrete angle of the bottom surface of the bounding box. Therefore, the safety monitoring device 10 can reduce the calculation amount and shorten the calculation time. Note that the calculation amount at the time of generating the bounding box is determined by the number of point clouds and the number of repetitions n of calculation based on the discrete angle $\Delta\theta$. Further, the calculation time is determined by performance of a central processing unit (CPU) of a personal computer (PC) constituting the safety monitoring device 10.

(22) As illustrated in FIGS. 19 to 22, the angle of the bottom surface of the bounding box discretely calculated by the smoothing means (angle smoothing unit 16d) of the safety monitoring device 10 according to the present embodiment may be configured to be arbitrarily changeable via a user interface.

Such a safety monitoring device 10 according to the present embodiment can select the value of the discrete angle $\Delta\theta$ by preparing a user interface, for example, so that the optimum discrete angle $\Delta\theta$ with respect to the angle $\theta$ of the bottom surface of the bounding box can be determined.

(23) As illustrated in FIGS. 20 and 21, any one or both of the smoothing method of the smoothing means (angle smoothing unit 16d) of the safety monitoring device 10 according to the present embodiment and the value of the smoothing time may be configured to be arbitrarily changeable via a user interface.

The angle smoothing processing is performed using past data from the present time point. At that time, the safety monitoring device 10 according to the present embodiment can select, for example, a method of simply performing averaging, a method of performing weighted averaging in which larger weighting is performed on those closer to the present time, or the like. In this way, the safety monitoring device 10 can perform smoothing processing of an angle suitable for the three-dimensional data input from the lidar 51. Note that smoothing a large amount of data can improve the smoothness of the video, but the responsiveness of calculation with respect to a change in input data decreases. Therefore, the safety monitoring device 10 may be configured to be able to select a suitable time according to the input data in consideration of responsiveness.

(24) The smoothing means (angle smoothing unit 16d) of the safety monitoring device 10 according to the present embodiment may be configured to smooth the center coordinates of the bottom surface of the bounding box.

The point cloud data varies for each frame. Therefore, not only the angle but also the center coordinates of the bounding box (the center coordinates of the rectangle of the bottom surface) vary. In order to suppress the variation, smoothing of the center coordinates of the bounding box is effective. Thus, the smoothing means (angle smoothing unit 16d) of the safety monitoring device 10 according to the present embodiment may be configured to smooth the center coordinates of the bottom surface of the bounding box. Note that, here, the center coordinates of the bounding box have been described as the center coordinates of the rectangle of the bottom surface, but the center coordinates of the bounding box can be processed as the center coordinates of a cuboidal region (rectangular region). In this case, smoothing of the center point of the cuboidal region (rectangular region) is also effective.

(25) As illustrated in FIGS. 23 to 28, the safety monitoring device 10 according to the present embodiment includes the recording management unit 19 that divides video data into files at predetermined time intervals and records the files in the storage unit 30, and the event list processing unit 23 that creates and manages an event list selectable for each event. The event list processing unit 23 may be configured to perform, for the event selected by the safety monitoring person, either control not to automatically erase the file including the video within a video reproduction time range of the event or control to re-save the file in another region of the storage unit 30.

Such a safety monitoring device 10 according to the present embodiment has data from which a video reproduction time range is known in each event, and can specify a file (video-recorded data) the video of which is to be reproduced from the data. Then, the safety monitoring device 10 is configured to be able to determine whether or not it is a file (video-recorded data) in which an incident (important occurrence) has occurred and to select the absence of automatic erasure when it is determined that the file should be left. In this way, the safety monitoring device 10 can perform management such that the file in which the incident (important occurrence) has occurred is not erased even if the file (video-recorded data) is set to be automatically erased on the basis of a determined rule. Such a safety monitoring device 10 can accumulate data related to similar incidents by leaving a file in which an incident (important occurrence) has occurred, and can cause the safety monitoring person to consider accident prevention measures.

(26) As illustrated in FIG. 28, the event list processing unit 23 of the safety monitoring device 10 according to the present embodiment has a function of automatically erasing a file on the basis of a predetermined rule. The predetermined rule may be configured such that a certain amount of free capacity of a recording means (the storage unit 30 or the external recording medium, which is not illustrated) is secured or a certain time elapses.

Such a safety monitoring device 10 according to the present embodiment can automatically erase the file on the basis of the predetermined rule. Note that, in a case where a file is automatically erased on the basis of the predetermined rule, it is preferable that the safety monitoring device 10 perform management such that a certain amount of free capacity can be secured in a configuration in which the capacity of the HDD, which is the recording means, is fully utilized. Further, in the configuration in which the file is automatically erased after a lapse of a certain time within a range in which the capacity of the HDD, which is the recording means, is large, it is clear how long data remains, and it is easy to manage the data, so that the safety monitoring device 10 may use the data depending on the use.

(27) As illustrated in FIG. 26, the event list processing unit 23 of the safety monitoring device 10 according to the present embodiment may be configured to acquire sensor data including one or both of the start time and the end time of an event occurring in the sensing target area from the safety sensor and determine a video reproduction time range of the event list.

Such a safety monitoring device 10 according to the present embodiment can reproduce the file (video data) in the video reproduction time range determined for each event, and thus can reproduce the file (video data) for a suitable time. Note that the safety monitoring device 10 can set, for example, the time when a person enters a warning issuing area as the start time of the event, and the time when the person leaves the warning issuing area as the end time of the event list. Such a safety monitoring device 10 can manage whether or not the person who has entered the dangerous area has evacuated from the dangerous area to a safe area. Note that the safety monitoring device 10 according to the present embodiment may be configured to be able to record data of one or both of the start time and the end time of the event depending on the use.

(28) As illustrated in FIGS. 23 to 28, the event list processing unit 23 of the safety monitoring device 10 according to the present embodiment may be configured to have a function of additionally registering an arbitrary occurrence having occurred in the past as a new event in the event list.

Such a safety monitoring device 10 according to the present embodiment can additionally register an arbitrary occurrence having occurred in the past as a new event in the event list according to the determination of the safety monitoring person. For example, even in the case where an event the safety monitoring device 10 has overlooked an occurrence in the past, when the safety monitoring person views the video of the file left in the recording means and determines that an incident (important occurrence) has occurred, the safety monitoring device 10 can additionally register the incident as a new event in the event list. In this case, the safety monitoring device 10 leaves the file (video-recorded data) in which the incident (important occurrence) has occurred without erasing the file.

(29) As illustrated in FIGS. 23 to 28, the event list processing unit 23 of the safety monitoring device 10 according to the present embodiment may be configured to have a function of editing the start time and the end time of the event.

Such a safety monitoring device 10 according to the present embodiment can arbitrarily edit the start time and the end time of the event (that is, the reproduction start time and the reproduction end time of the file related to the event). For example, a case where an incident (important occurrence) occurs before a person enters a dangerous area, or a case where a dangerous situation continuously occurs even after a person who has entered the dangerous area leaves the dangerous area is assumed. In such a case, the safety monitoring device 10 can leave the file of the time zone by changing the start time and/or the end time of the event.

(30) The safety monitoring device 10 according to the present embodiment includes the video processing unit 18 that performs processing corresponding to the type of the alarm activation function with respect to the video data of the sensing target area. As illustrated in FIGS. 23 to 28, the video processing unit 18 of the safety monitoring device 10 according to the present embodiment may be configured to create a display screen for simultaneously displaying a video and an event list on the display 42 (display unit), and when a specific event is designated by the safety monitoring person from the event list via a graphical user interface, display a video including a video reproduction time range of the designated event on the display 42 (display unit).

Such a safety monitoring device 10 according to the present embodiment can reproduce a video of an arbitrary event on the basis of the event list. The safety monitoring person can efficiently confirm the degree of danger at the site by viewing the reproduced video. Such a safety monitoring device 10 can facilitate the management of the event by simultaneously displaying the video and the event list on the display 42 (display unit), and can improve the work efficiency such as the event display operation and the event editing.

(31) As illustrated in FIGS. 23 to 28, in the safety monitoring device 10 according to the present embodiment, the event list may be configured such that an important mark for selecting the presence or absence of automatic erasure of a file is added for each event via a graphical user interface.

Such a safety monitoring device 10 according to the present embodiment can add an important mark for each event. Therefore, for example, a safety manager can easily change the setting of each event from the presence of the automatic erasure to the absence by adding an important mark to each event. In this way, the safety manager can easily leave the file in which the incident (important occurrence) has occurred.

(32) As illustrated in FIGS. 23 to 28, the event list processing unit 23 of the safety monitoring device 10 according to the present embodiment may be configured to perform control not to automatically erase a file including a period from a certain time before the start time of an event for which the absence of automatic erasure is selected at the timing of selecting the presence or absence of automatic erasure of the file and an event to which an important mark is added in advance to a certain time after the end time.

Such a safety monitoring device 10 according to the present embodiment can perform control not to automatically erase the files of the event for which the absence of automatic erasure is selected and the event to which the important mark is added in advance. Note that the safety monitoring device 10 can add or delete an important mark from the present time point to the timing of automatic erasure of the file. Further, the safety monitoring device 10 can change the time of each event from the present time point to the timing of the automatic erasure of the file.

(33) As illustrated in FIGS. 23 to 28, the event list processing unit 23 of the safety monitoring device 10 according to the present embodiment may be configured to perform control to erase the file of the event in a case where the event for which the absence of the automatic erasure is selected is changed to the event for which the presence of the automatic erasure is selected or in a case where the important mark is removed from the event to which the important mark is added in advance.

Such a safety monitoring device 10 according to the present embodiment can perform control to erase the file of the event when the selection of the event is changed to the event for which the presence of the automatic erasure is selected or when the important mark is removed. In this way, the safety monitoring device 10 can increase the free capacity of the HDD. That is, the safety monitoring device 10 is configured to leave the video data file related to the event to which the important mark is added without erasing the video data file even when a predetermined time elapses after the video-recording. However, in a case where the safety monitoring person confirms the risk of each event on the basis of the event list, even if an important mark is added to the event, it may be determined that the risk is low. In such a case, the safety monitoring device 10 can erase the video data file related to the event from which the important mark is removed by removing the important mark. In this way, the safety monitoring device 10 can increase the free capacity of the HDD.

(34) As illustrated in FIGS. 23 to 28, the event list processing unit 23 of the safety monitoring device 10 according to the present embodiment may be configured to perform control such that while an event of a file is deleted from the event list in a case where a file for which a predetermined time has elapsed since recording is automatically erased, an event for which the absence of automatic erasure is selected at the timing of selecting the presence or absence of automatic erasure of the file and an event to which an important mark is added in advance are not deleted from the event list.

Such a safety monitoring device 10 according to the present embodiment can prevent an event for which the absence of automatic erasure is selected and an event to which an important mark is added from being erroneously erased. Note that the event list and the video data file have a one-to-one correspondence. Therefore, the event corresponding to the video data file is deleted from the event list at the same time as the deletion of the video data file to be deleted. Therefore, the safety monitoring person can prevent an event that should not be erased from being erroneously erased.

(35) The safety monitoring device 10 according to the present embodiment includes the safety monitoring unit 22 that monitors entry of an object into a monitoring region of a safety sensor. The safety monitoring unit 22 may be configured to notify the event list processing unit 23 of the start time and the end time of the event by setting the time when the object enters the monitoring region as the start time of the event and setting the time when the object leaves the monitoring region or the time when a certain time has elapsed from the start time of the event as the end time of the event.

Such a safety monitoring device 10 according to the present embodiment can automatically sense the start time and the end time of the event and notify the event list processing unit 23 of the start time and the end time of the event. The safety monitoring device 10 can monitor the dangerous area three-dimensionally regardless of day or night by using, for example, the lidar 51, which is a safety sensor.

As described above, the safety monitoring device 10 according to the present embodiment can satisfactorily grasp the relationship between a person and an object.

Note that the present invention is not limited to the above-described embodiment, and various changes and modifications can be made without departing from the gist of the present invention.

For example, the above-described embodiment has been described in detail for easy understanding of the gist of the present invention. Therefore, the present invention is not necessarily limited to those including all the components described above. Further, in the present invention, another component can be added to a certain component, or some components can be changed to other components. Further, in the present invention, some components can be eliminated.

Furthermore, for example, in the above-described embodiment, the safety monitoring device 10 monitors the safety of an area on the basis of three-dimensional data, but can monitor the safety of an area on the basis of two-dimensional data.

REFERENCE SIGNS LIST

10 Safety monitoring device
11 Control unit
12 Area setting unit
13 Alarm activation type setting unit
14 Video acquisition unit
15 Lidar data acquisition unit (sensor data acquisition unit)
16 Moving body recognition analysis unit
16a Foreground data extraction unit
16b Clustering processing unit
16c Bounding box generation unit
16d Angle smoothing unit (smoothing means)
16e, 18a Image recognition unit
16f Alarm activation analysis unit
17 Result output unit
18 Video processing unit
19 Recording management unit
20 Video display processing unit
21 Safety sensor input unit
22 Safety monitoring unit
23 Event list processing unit
30 Storage unit
31 Setting recording data
32 Video recording data
33 Processed image data
39 Communication unit
41 Operation unit
42 Display (display unit)
43 Warning lamp
44 Speaker (sounding unit)
50 Safety sensor
51 Lidar
61 Monitoring camera (photographing unit)
61z Monitoring camera (photographing unit, external device)
61a Setting reception unit
61b Setting processing unit
61c Notification unit
62 Web terminal (external device)
62a Notification acquisition unit
100, 110 Display screen
101 3D viewer unit
101a Alarm activation target area frame
102 Setting unit
103 Lidar selection unit
104 Alarm activation target area tab
104a Block tab
104b Validity check box
104c Area selection unit
104d Display color setting unit
105 Moving body
105a Large object
105box, 106box Bounding box
106 Person
106o Center point
106r Radius
111 Video display unit
112 Event list display unit
120 Event list
121 Important mark field
122 Time stamp field 123 Camera name field
124 Type field
125 Description field
130 Event editing screen
131 Camera name field
132 User name field
133 Occurrence date and time field
134 End date and time field
135 Description field
136 Type field
137 Mark field
138 Cause field
139 Measure field
140 Importance field
A51 Sensing target area
A61a, A61b Alarm activation target area
A62 Alarm activation exclusion area
B61a, B61b Alarm activation portion
B62 Exclusion portion
D Depth
G Ground
H, Hb, Ht Height
Pr Control program
R Certain distance
R11 Walking route
S Safety monitoring system
Su1, Su2, Su3, Su4, Su5, Su6, Su8, Sub Surface
W Width

The invention claimed is:

1. A safety monitoring device comprising:
an area setter that sets a plurality of alarm activation target areas with respect to a sensing target area of a safety sensor;
an alarm activation type setter that
provides a user interface which presents a plurality of types of alarm activation functions, the plurality of types of alarm activation functions including any two or more of:
a function of issuing a warning to all moving bodies;
a function of issuing a warning only to a person;
a function of issuing a warning in a case where a distance between a person and a large object larger than the person is within a certain distance;
a function of issuing a warning in a case where a person enters a traveling direction of the large object;
an alarm activation function of issuing a warning only to a moving body at a certain speed or higher;
an alarm activation function of issuing a warning only to a moving body at a certain speed or lower;
a function of combining two or more arbitrary functions to obtain a logical sum; and
a function of combining two or more arbitrary functions to obtain a logical product, as the type of the alarm activation function;
receives, via the user interface, designation indicating one of the plurality of types of alarm activation functions, and
sets the one of the plurality of types of alarm activation functions with respect to each of the alarm activation target areas; and
a moving body recognition analyzer that recognizes a motion of a moving body on the basis of sensor data measured by the safety sensor.

2. The safety monitoring device according to claim 1, comprising:
a sensor data acquisitor that acquires three-dimensional data as the sensor data from the safety sensor, wherein
the moving body recognition analyzer extracts a moving body from the sensing target area on the basis of the three-dimensional data, and senses traveling of the moving body to each of the alarm activation target areas.

3. The safety monitoring device according to claim 1, wherein
the moving body recognition analyzer
extracts point cloud data representing a moving body from three-dimensional data measured with a lidar, which is the safety sensor, and creates a bounding box having a size necessary for surrounding the point cloud data,
determines a minimum value and a maximum value of each of five pieces of data including a width, a depth, and a height of the bounding box, and a height of a bottom surface and a height of a top surface of the bounding box, as a size of a person by using any one or more or all of the five pieces of data, and
determines that the size of the moving body is within a determined range as a determination condition of person, and identifies the moving body as a person when the size of the moving body continuously conforms to the determination condition for an arbitrarily determined certain time.

4. The safety monitoring device according to claim 3, wherein
the moving body recognition analyzer
identifies a large object larger than a person by using any one or more or all of the five pieces of data including the width, the depth, and the height of the bounding box, and the height of the bottom surface and the height of the top surface of the bounding box,
calculates, as a distance between the person and the large object, a distance obtained by subtracting a radius of a circumscribed circle of the bottom surface or the top surface of the bounding box of the person from a minimum value of a distance between a center of the bottom surface or the top surface of the bounding box of the person and each side of the bottom surface or the top surface of the bounding box of the large object, and
issues a warning when the distance between the person and the large object becomes smaller than an arbitrarily determined certain distance.

5. The safety monitoring device according to claim 4, wherein the moving body recognition analyzer issues a warning when a time during which the distance between the person and the large object becomes smaller than the certain distance continues for an arbitrarily determined certain time.

6. The safety monitoring device according to claim 4, wherein the moving body recognition analyzer stops a warning when the distance between the person and the large object becomes larger than the certain distance.

7. The safety monitoring device according to claim 4, wherein the moving body recognition analyzer stops a warning when a time during which the distance between the person and the large object becomes larger than the certain distance continues for arbitrarily determined certain or more time.

8. The safety monitoring device according to claim 4, wherein the moving body recognition analyzer changes an alarm level according to the distance between the person and the large object.

9. The safety monitoring device according to claim 3, wherein the moving body recognition analyzer calculates a speed of the moving body from a distance over which a center position of the bounding box has moved for a certain time.

10. The safety monitoring device according to claim 1, comprising:
a video processor that superimposes a position of the moving body sensed by the safety sensor on video data.

11. The safety monitoring device according to claim 1, further comprising:
a recording manager that records and manages video data obtained by photographing a whole or a part of the sensing target area in a storage; and
an event list processor that adds an event, which is alarm activation data, to an event list and manages the event when a warning is issued, wherein
the recording manager constantly records the video data in the storage, and
when an arbitrary alarm activation portion is designated from the event list, the event list processor displays video data of a certain time before and after of the designated alarm activation portion on a display.

12. The safety monitoring device according to claim 11, wherein
the event list processor can filter and display alarm activation data for each type with respect to the event list displayed on the display.

13. The safety monitoring device according to claim 1, further comprising:
a recording manager that records and manages video data of the sensing target area in a storage, wherein
the recording manager records the video data before and after a base point in the storage, the base point being a time point at which an occurrence for which a warning is issued occurs according to a type of an alarm activation function.

14. The safety monitoring device according to claim 1, wherein
the alarm activation type setter can designate processing of sensing a feature of the moving body from video data of the sensing target area as the alarm activation function.

15. The safety monitoring device according to claim 14, wherein
the processing of sensing the moving body includes any one of person identification by face recognition, sex determination, and posture determination.

16. The safety monitoring device according to claim 1, wherein
the safety monitoring device notifies an external device equipped with a program for performing camera video processing of warning data sensed by a set alarm activation function.

17. The safety monitoring device according to claim 3, comprising:
a smoother that smooths an angle of the bounding box.

18. The safety monitoring device according to claim 17, comprising:
a video processor that performs processing according to a type of the alarm activation function with respect to the three-dimensional data, wherein
the video processor displays the point cloud data and the bounding box on a display simultaneously.

19. The safety monitoring device according to claim 17, wherein the smoother smooths and calculates an angle of the bottom surface of the bounding box.

20. The safety monitoring device according to claim 19, wherein
the angle of the bottom surface of the bounding box discretely calculated by the smoother can be arbitrarily changed via a user interface.

21. The safety monitoring device according to claim 17, wherein
any one or both of a smoothing method of the smoother and a value of smoothing time can be arbitrarily changed via a user interface.

22. The safety monitoring device according to claim 17, wherein
the smoother smooths center coordinates of the bottom surface of the bounding box.

23. The safety monitoring device according to claim 1, comprising:
a recording manager that records video data in a storage by dividing the video data into files at predetermined time intervals; and
an event list processor that creates and manages an event list selectable for each event, wherein
the event list processor performs, for an event selected by a safety monitoring person, either control not to automatically erase the file including a video within a video reproduction time range of the event or control to re-save the file in another region of the storage.

24. The safety monitoring device according to claim 23, wherein
the event list processor has a function of automatically erasing the file on the basis of a predetermined rule, and
the predetermined rule is one of securing a certain amount of free capacity of a recorder or a lapse of a certain time.

25. The safety monitoring device according to claim 23, wherein
the event list processor acquires sensor data including one or both of a start time and an end time of an event occurring in the sensing target area from the safety sensor and determines the video reproduction time range of the event list.

26. The safety monitoring device according to claim 23, wherein
the event list processor has a function of additionally registering an arbitrary occurrence having occurred in a past as a new event in the event list.

27. The safety monitoring device according to claim 23, wherein
the event list processor has a function of editing a start time and an end time of the event.

28. The safety monitoring device according to claim 23, comprising:
a video processor that performs processing corresponding to a type of the alarm activation function on video data of the sensing target area, wherein
the video processor creates a display screen for simultaneously displaying the video and the event list on a display, and when a specific event is designated by a safety monitoring person from the event list via a graphical user interface, displays a video including a video reproduction time range of the designated event on the display.

29. The safety monitoring device according to claim 28, wherein
the event list enables an important mark for selecting presence or absence of automatic erasure of the file to be added for each event via the graphical user interface.

30. The safety monitoring device according to claim 29, wherein
the event list processor performs control not to automatically erase a file including a period from a certain time before a start time of an event for which absence of automatic erasure is selected at a timing of selecting presence or absence of automatic erasure of the file and an event to which the important mark is added in advance to a certain time after an end time.

31. The safety monitoring device according to claim 30, wherein
the event list processor performs control to erase the file of the event in a case where the event for which absence of the automatic erasure is selected is changed to the event for which presence of the automatic erasure is selected or in a case where the important mark is removed from the event to which the important mark is added in advance.

32. The safety monitoring device according to claim 29, wherein
the event list processor performs control such that while an event of a file is deleted from the event list in a case where a file for which a predetermined time has elapsed since recording is automatically erased, an event for which absence of automatic erasure is selected at a timing of selecting presence or absence of automatic erasure of the file and an event to which the important mark is added in advance are not deleted from the event list.

33. The safety monitoring device according to claim 23, further comprising:
a safety monitor that monitors entry of an object into a monitoring region of the safety sensor, wherein
the safety monitor notifies the event list processor of a start time and an end time of the event by setting a time when the object enters the monitoring region as the start time of the event and setting a time when the object leaves the monitoring region or a time when a certain time has elapsed from the start time of the event as the end time of the event.

34. A safety monitoring method comprising:
an area setting process that sets a plurality of alarm activation target areas with respect to a sensing target area of a safety sensor;
an alarm activation type setting process that
provides a user interface which presents a plurality of types of alarm activation functions, the plurality of types of alarm activation functions including any two or more of:
a function of issuing a warning to all moving bodies;
a function of issuing a warning only to a person;
a function of issuing a warning in a case where a distance between a person and a large object larger than the person is within a certain distance;
a function of issuing a warning in a case where a person enters a traveling direction of the large object;
an alarm activation function of issuing a warning only to a moving body at a certain speed or higher;
an alarm activation function of issuing a warning only to a moving body at a certain speed or lower;
a function of combining two or more arbitrary functions to obtain a logical sum; and
a function of combining two or more arbitrary functions to obtain a logical product, as the type of the alarm activation function;
receives, via the user interface, designation indicating one of the plurality of types of alarm activation functions, and
sets the one of the plurality of types of alarm activation functions with respect to each of the alarm activation target areas; and
a moving body recognition analysis process that recognizes a motion of a moving body on the basis of sensor data measured by the safety sensor.

35. A non-transitory recording medium storing a computer readable program for causing a computer to function as safety monitoring for ensuring safety of a sensing target area of a safety sensor, the program causing the computer to function as:
an area setter that sets a plurality of alarm activation target areas with respect to a sensing target area of the safety sensor;
an alarm activation type setter that
provides a user interface which presents a plurality of types of alarm activation functions, the plurality of types of alarm activation functions including any two or more of:
a function of issuing a warning to all moving bodies;
a function of issuing a warning only to a person;
a function of issuing a warning in a case where a distance between a person and a large object larger than the person is within a certain distance;
a function of issuing a warning in a case where a person enters a traveling direction of the large object;
an alarm activation function of issuing a warning only to a moving body at a certain speed or higher;
an alarm activation function of issuing a warning only to a moving body at a certain speed or lower;
a function of combining two or more arbitrary functions to obtain a logical sum; and
a function of combining two or more arbitrary functions to obtain a logical product, as the type of the alarm activation function;
receives, via the user interface, designation indicating one of the plurality of types of alarm activation functions, and
sets the one of the plurality of types of alarm activation functions with respect to each of the alarm activation target areas; and
a moving body recognition analyzer that recognizes a motion of a moving body on the basis of sensor data measured by the safety sensor.

\* \* \* \* \*